US010534434B2

(12) United States Patent
Yoo et al.

(10) Patent No.: US 10,534,434 B2
(45) Date of Patent: Jan. 14, 2020

(54) APPARATUS AND METHOD FOR USING BLANK AREA IN SCREEN

(71) Applicant: Samsung Electronics Co., Ltd., Suwon-si, Gyeonggi-do (KR)

(72) Inventors: Nagyeom Yoo, Yongin-si (KR); Soojin Park, Suwon-si (KR); Hyungjin Park, Yongin-si (KR); Bohyun Yu, Uiwang-si (KR); Hyunchul Choi, Suwon-si (KR); Hyosun Choi, Suwon-si (KR); Sooji Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1071 days.

(21) Appl. No.: 14/934,600

(22) Filed: Nov. 6, 2015

(65) Prior Publication Data

US 2016/0132222 A1    May 12, 2016

(30) Foreign Application Priority Data

Nov. 12, 2014    (KR) .................. 10-2014-0157405

(51) Int. Cl.
*G06F 3/01*    (2006.01)
*G06F 3/0488*    (2013.01)
*G06F 3/0486*    (2013.01)
*G06F 3/16*    (2006.01)
*G06F 3/0481*    (2013.01)

(52) U.S. Cl.
CPC ............ *G06F 3/016* (2013.01); *G06F 3/0486* (2013.01); *G06F 3/0488* (2013.01); *G06F 3/04817* (2013.01); *G06F 3/167* (2013.01); *G06F 2203/014* (2013.01); *G06F 2203/04803* (2013.01)

(58) Field of Classification Search
None
See application file for complete search history.

(56) References Cited

U.S. PATENT DOCUMENTS

| 5,140,678 | A | * | 8/1992 | Torres | G06F 3/0481 |
| | | | | | 715/776 |
| 6,983,331 | B1 | * | 1/2006 | Mitchell | H04L 67/06 |
| | | | | | 709/246 |
| 7,437,678 | B2 | * | 10/2008 | Awada | G06F 3/0481 |
| | | | | | 715/784 |
| 7,765,470 | B2 | * | 7/2010 | Epstein | G06F 17/217 |
| | | | | | 715/243 |
| 8,529,073 | B2 | | 9/2013 | Jung et al. | |

(Continued)

FOREIGN PATENT DOCUMENTS

KR    10-1102851 B1    12/2011
KR    10-2013-0076028 A    7/2013
KR    10-1422280 B1    7/2014

*Primary Examiner* — Yongjia Pan
(74) *Attorney, Agent, or Firm* — Jefferson IP Law, LLP

(57) ABSTRACT

An apparatus and a method for using a blank area in a screen are provided. The electronic device includes a touch screen configured to display content and receive an event for moving the content and a processor configured to move the content to a location or in a direction based on the event, configure a blank area based on the movement of content, and display setting information in the blank area. Further, various embodiments can be implemented.

23 Claims, 30 Drawing Sheets

(56) References Cited

U.S. PATENT DOCUMENTS

| | | | |
|---|---|---|---|
| 8,875,047 B2* | 10/2014 | Beykpour | G06F 3/0481 715/772 |
| 9,164,544 B2* | 10/2015 | Sirpal | G06F 1/1632 |
| 9,213,365 B2* | 12/2015 | Sirpal | G06F 1/1616 |
| 9,489,080 B2* | 11/2016 | Seo | G06F 1/1641 |
| 9,798,447 B2* | 10/2017 | Karunamuni | G06F 3/0482 |
| 2002/0089546 A1* | 7/2002 | Kanevsky | G06F 3/0481 715/800 |
| 2003/0007017 A1* | 1/2003 | Laffey | G06F 3/04812 715/862 |
| 2006/0041846 A1* | 2/2006 | Masselle | G06F 3/0481 715/793 |
| 2006/0080621 A1* | 4/2006 | Park | G06F 3/04883 715/788 |
| 2006/0086022 A1* | 4/2006 | Would | G06F 3/0482 40/584 |
| 2006/0200780 A1* | 9/2006 | Iwema | G06F 3/0488 715/810 |
| 2010/0088634 A1* | 4/2010 | Tsuruta | G06F 3/0481 715/800 |
| 2010/0253486 A1* | 10/2010 | Sato | G06F 3/0416 340/407.2 |
| 2011/0273540 A1* | 11/2011 | Lee | G06F 3/0346 348/51 |
| 2012/0047463 A1* | 2/2012 | Park | G06F 3/0482 715/810 |
| 2012/0105363 A1* | 5/2012 | Sirpal | G06F 1/1616 345/174 |
| 2012/0131519 A1* | 5/2012 | Jitkoff | G06F 3/0481 715/863 |
| 2012/0249579 A1* | 10/2012 | Matthews | G06F 3/048 345/619 |
| 2012/0289290 A1 | 11/2012 | Chae et al. | |
| 2013/0019182 A1* | 1/2013 | Gil | G06F 3/0482 715/738 |
| 2014/0089833 A1 | 3/2014 | Hwang et al. | |
| 2014/0310646 A1* | 10/2014 | Vranjes | G06F 9/451 715/788 |
| 2015/0100885 A1* | 4/2015 | Riley | H04M 1/72519 715/720 |
| 2015/0304593 A1* | 10/2015 | Sakai | G09G 5/14 348/565 |

\* cited by examiner

FIG. 6
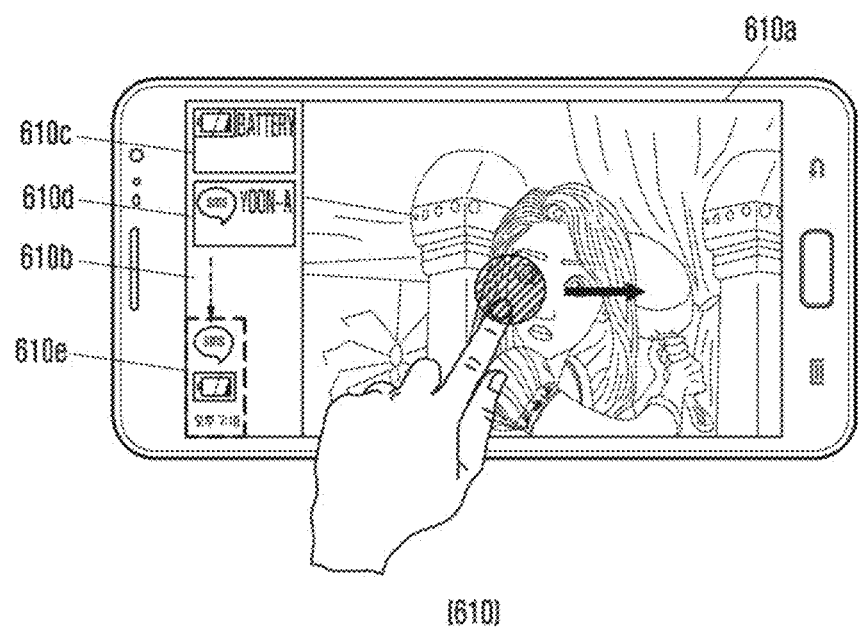
(610)
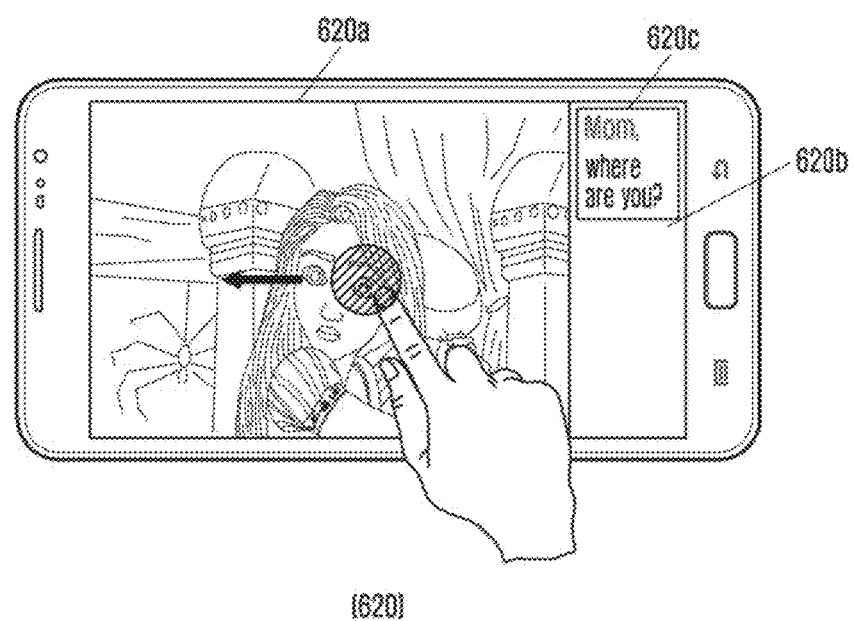
(620)

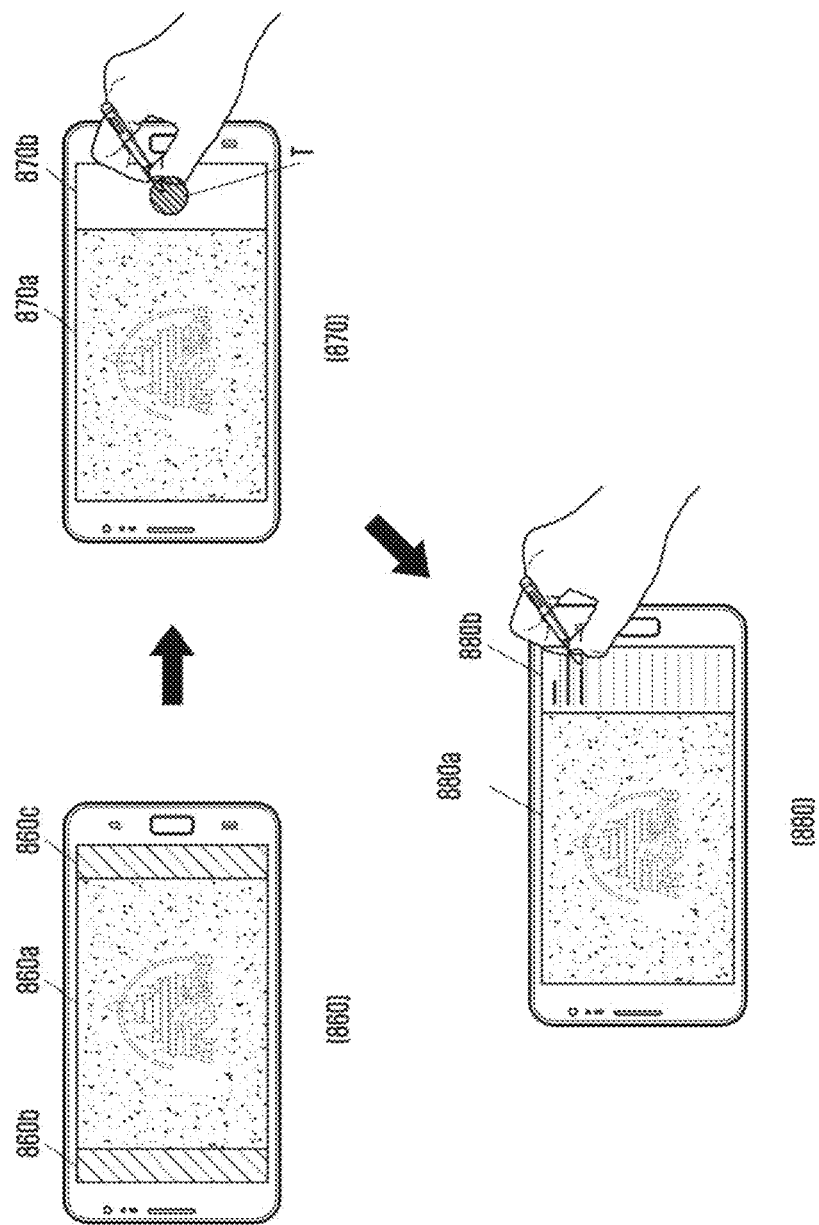

FIG. 12
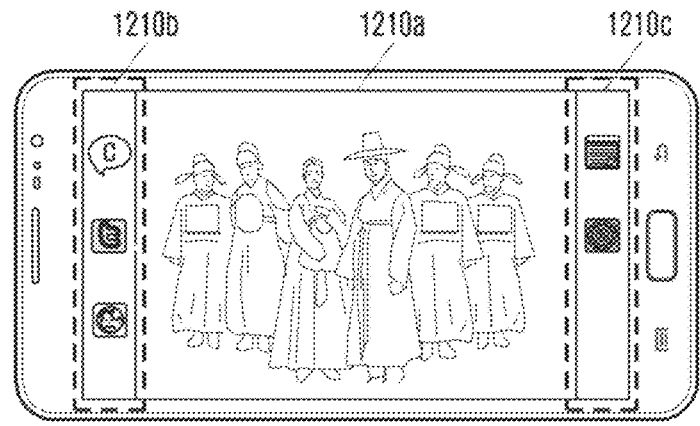
[1210]
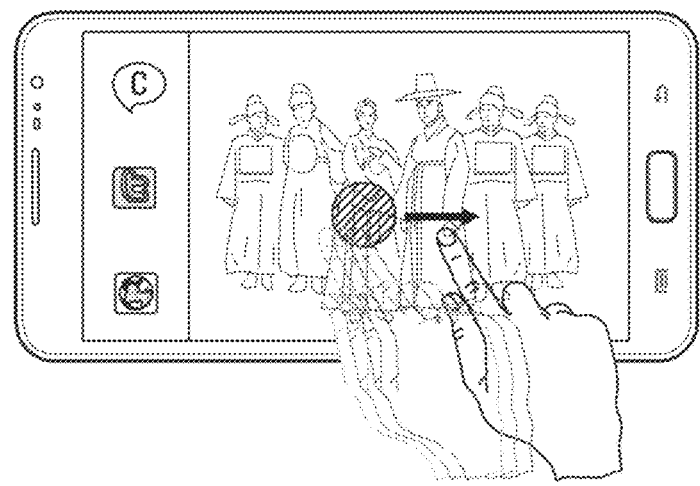
[1220]
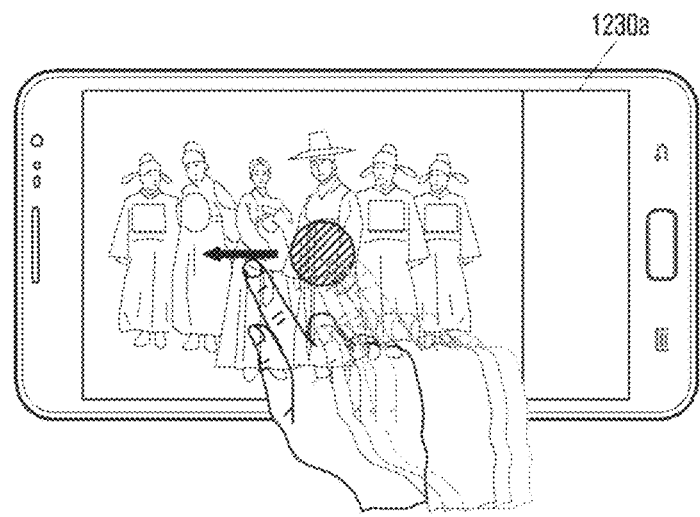
[1230]

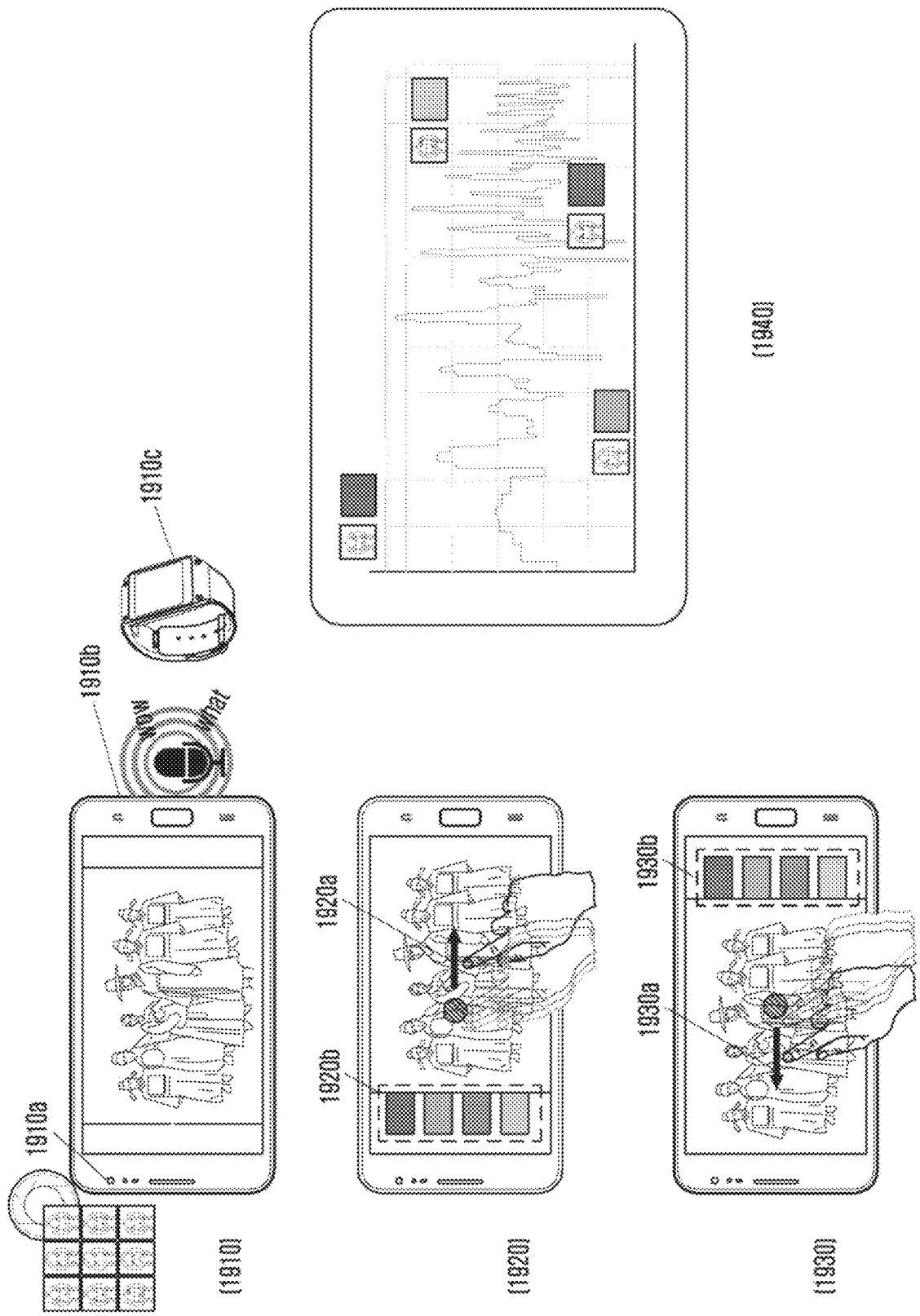

FIG. 20C
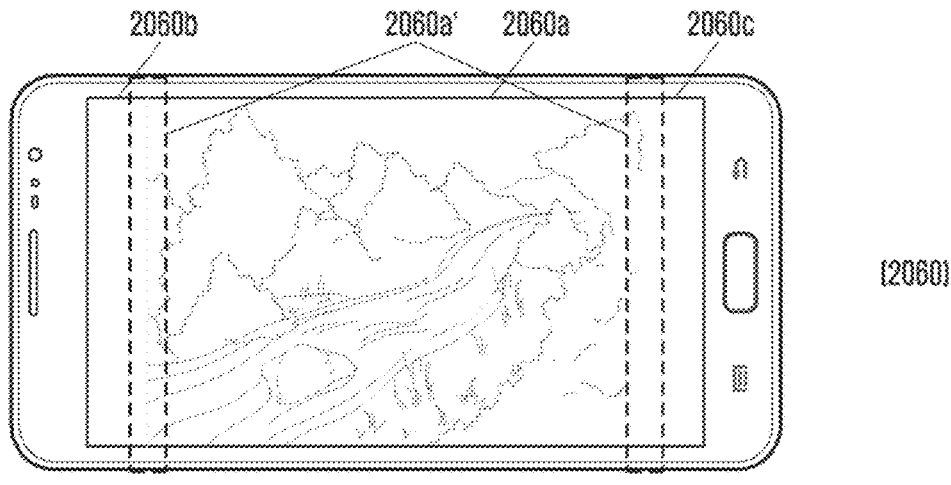
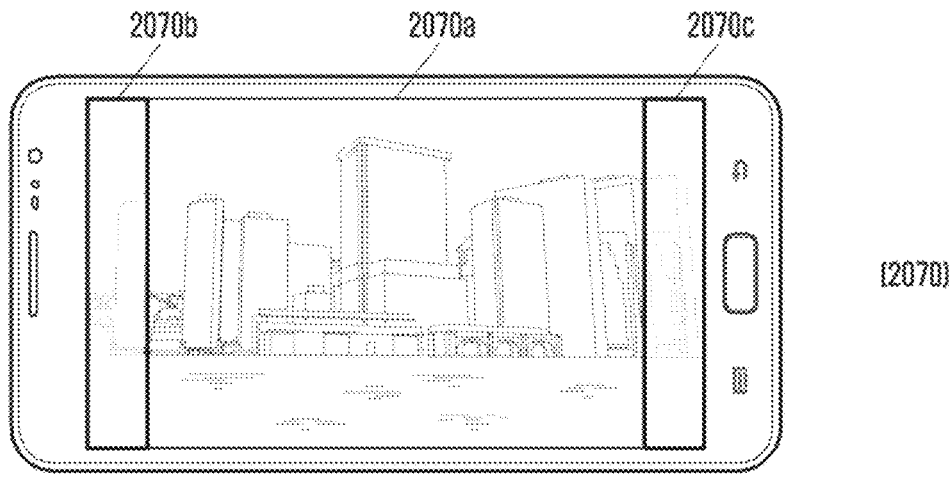
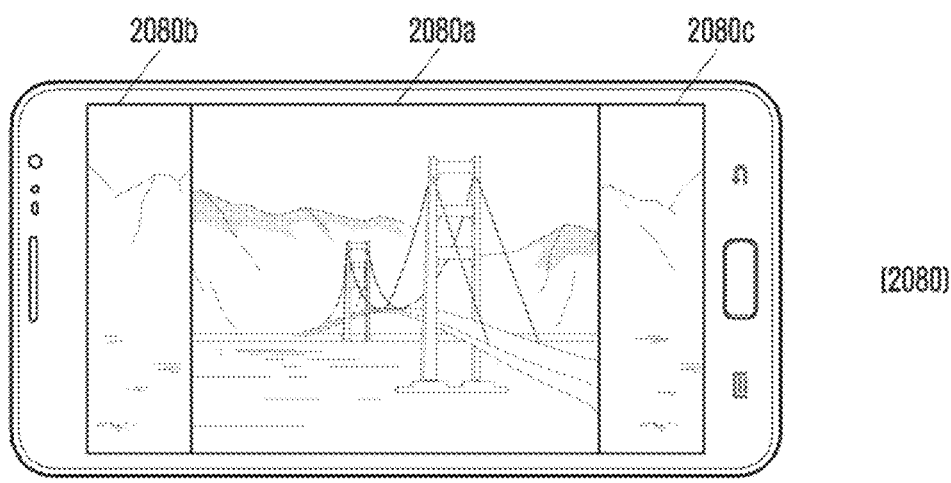

FIG. 21A
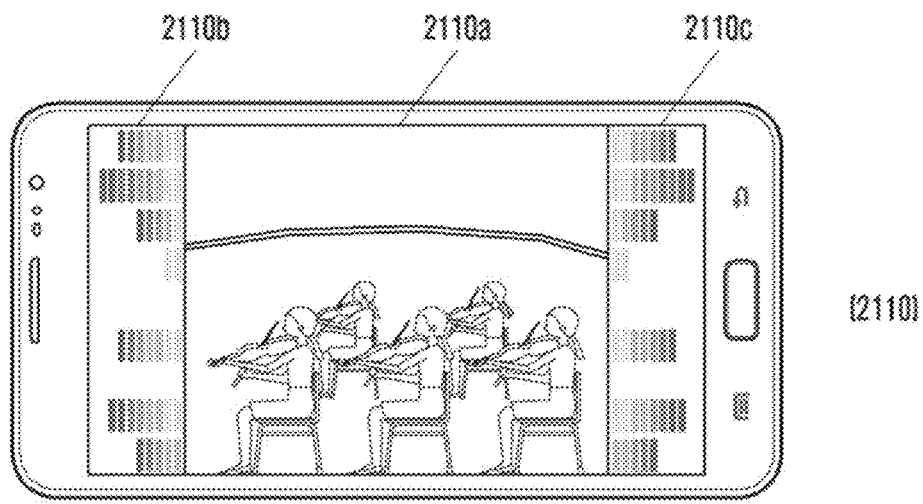
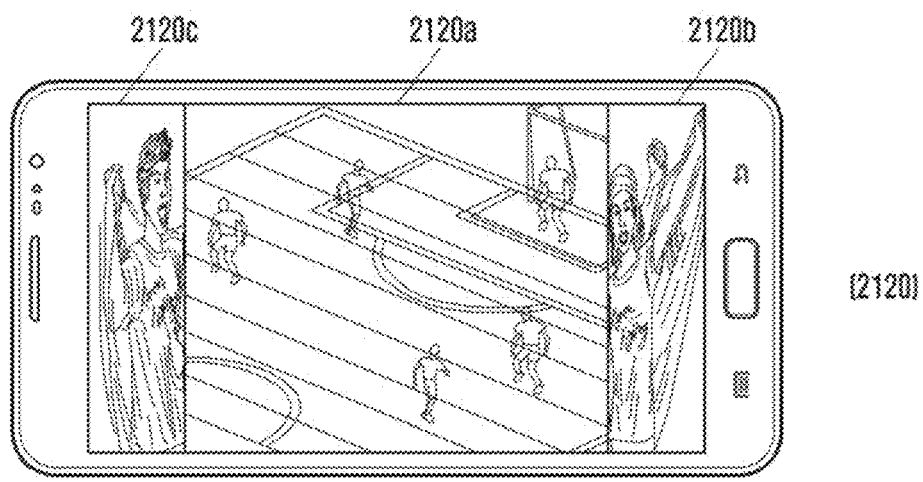
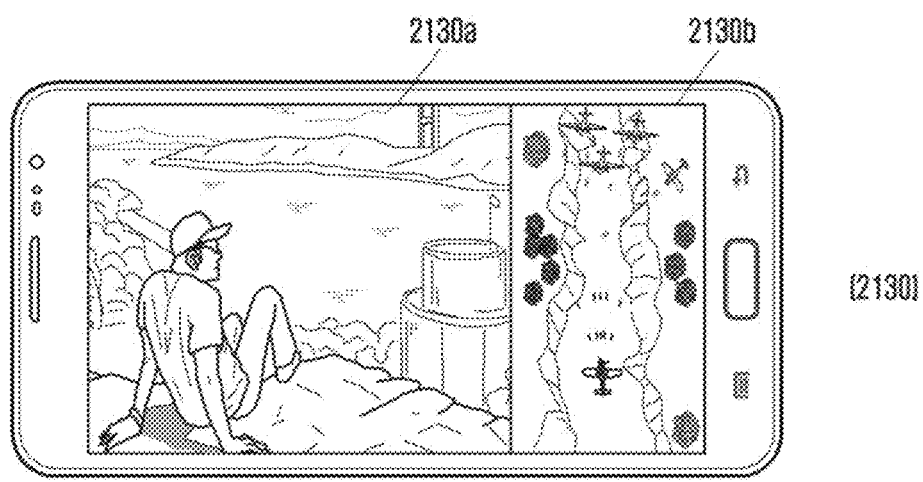

FIG. 21C
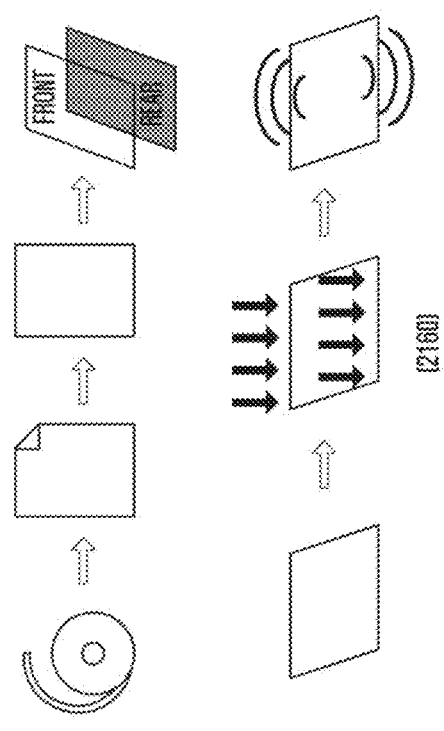
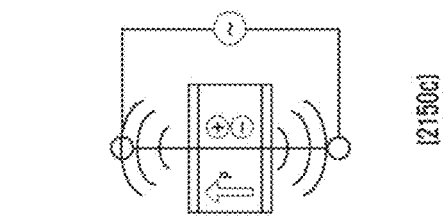
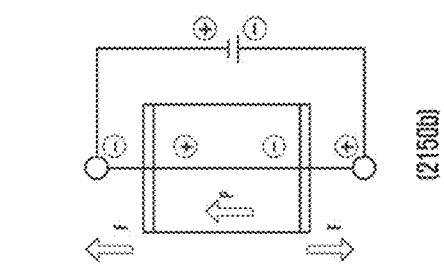
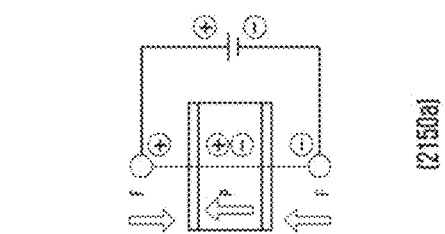

APPARATUS AND METHOD FOR USING BLANK AREA IN SCREEN

CROSS-REFERENCE TO RELATED APPLICATION(S)

This application claims the benefit under 35 U.S.C. § 119(a) of a Korean patent application filed on Nov. 12, 2014 in the Korean Intellectual Property Office and assigned Serial number 10-2014-0157405, the entire disclosure of which is hereby incorporated by reference.

TECHNICAL FIELD

The present disclosure relates to a method for providing various functions by using a blank area of a screen in an electronic device.

BACKGROUND

When a screen ratio of display unit such as a television (TV) and a smartphone is different from an image ratio of content output through the display unit, a blank area is formed at the right, left, upper, and/or lower side. This is due to the screen ratio of the display unit being fixed. For example, the blank area of the display unit appears in a black color if the image ratio of content is not adjusted to the screen ratio of the display unit.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a screen of display unit is divided into two areas, and a first program and a second program are displayed in the divided areas.

Another aspect of the present disclosure is to provide an apparatus and a method for providing various functions in a blank area without having to reduce the size or ratio of content natively to be output.

Another aspect of the present disclosure is to provide an apparatus and a method for providing various functions in a blank area by adjusting the size or ratio of content natively to be output.

In accordance with an aspect of the present disclosure, an electronic device is provided. The electronic device includes a touch screen configured to display content and receive an event for moving the content and a processor configured to move the content to a location or in a direction based on the event, configure a blank area based on the movement of content, and display setting information in the blank area.

In accordance with another aspect of the present disclosure, an electronic device is provided. The electronic device includes a display unit configured to display content, a processor configured to configure a blank area based on a location of the displayed content, and display a notification in the blank area.

In accordance with another aspect of the present disclosure, a method for using a blank area in a screen of electronic device is provided. The method includes displaying content, receiving an event for moving the content, moving the content to a location or in a direction corresponding to the event, configuring a blank area based on the content movement, and displaying setting information in the blank area.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 6 illustrates screen examples of executing various functions in a blank area according to various embodiments of the present disclosure;

FIGS. 8A and 8B illustrate screen examples of moving content by detecting a grip position according to various embodiments of the present disclosure;

FIG. 12 illustrates screen example of closing a function executing in a blank area corresponding to content movement according to various embodiments of the present disclosure;

FIGS. 19A and 19B illustrate screen examples of outputting content and feedback information by using biometric information according to various embodiments of the present disclosure;

FIGS. 20A, 20B, and 20C illustrate screen examples of using a blank area in a screen according to various embodiments of the present disclosure; and FIGS. 21A, 21B, and 21C illustrate screen examples of using a blank area in a screen according to various embodiments of the present disclosure.

Throughout the drawings, it should be noted that like reference numbers are used to depict the same or similar elements, features, and structures.

DETAILED DESCRIPTION

Figure 1:
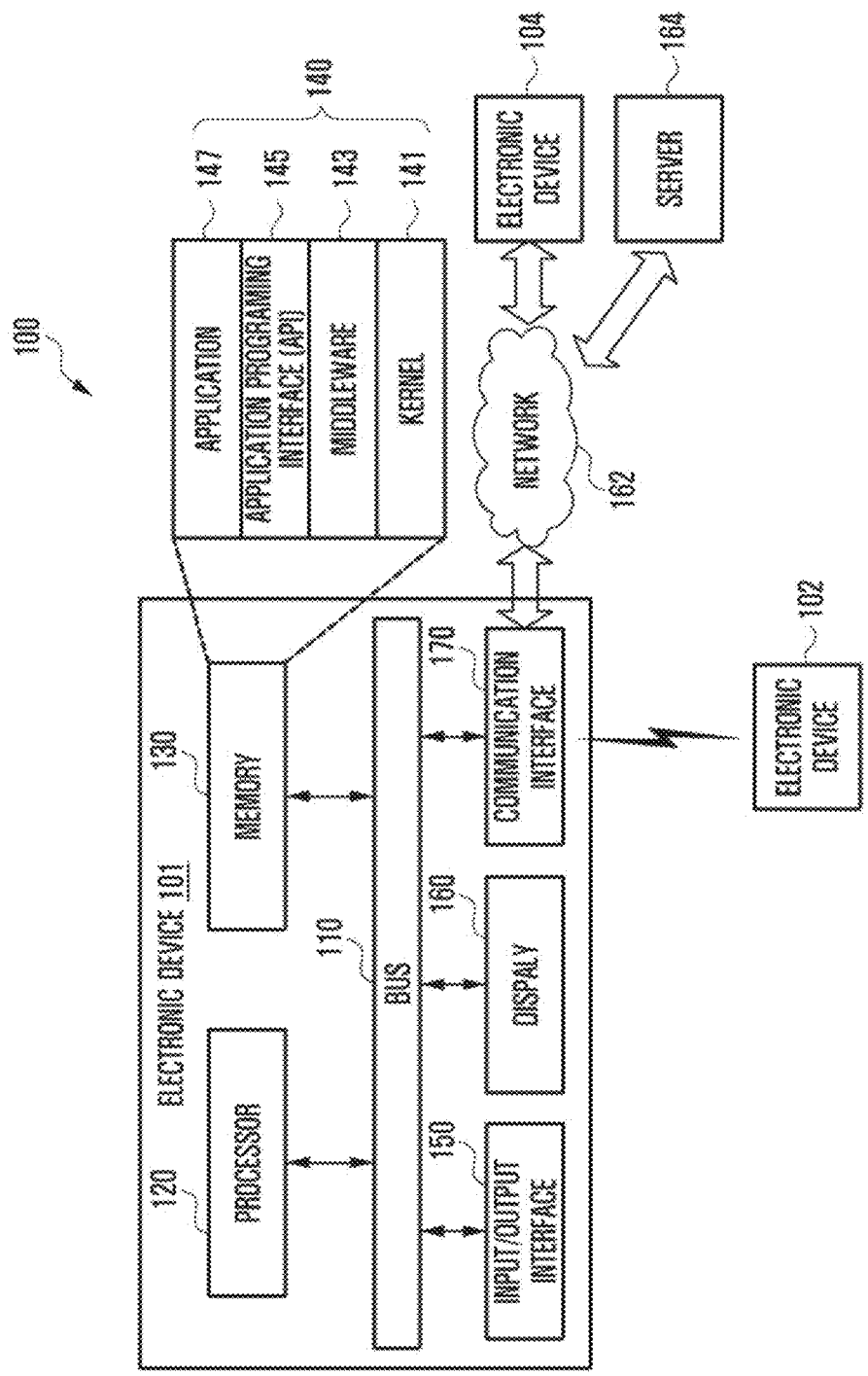
FIG. 1 is a block diagram illustrating a network according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In various embodiments of the present disclosure, the expression "or" or "at least one of A or/and B" includes any or all of combinations of words listed together. For example, the expression "A or B" or "at least A or/and B" may include A, may include B, or may include both A and B.

The expression "1", "2", "first", or "second" used in various embodiments of the present disclosure may modify various components of the various embodiments but does not limit the corresponding components. For example, the above expressions do not limit the sequence and/or importance of the components. The expressions may be used for distinguishing one component from other components. For example, a first user device and a second user device indicate different user devices although both of them are user devices. For example, without departing from the scope of the present disclosure, a first structural element may be referred to as a second structural element. Similarly, the second structural element also may be referred to as the first structural element.

The expression "configured to" uses in the present disclosure may be replaced, according to situations, with "suitable for". "having the capacity to", "designed to", "adapted to", "made to", or "capable of". The term "configured to" may not always mean "specially designed to". In some situations, "device configured to" may mean that the device can "do something" with other devices or components. For example, a context "processor configured to execute A, B, and C" may mean a dedicated processor (for example, embedded processor) for executing a corresponding operation, or a generic-purpose processor (for example, CPU or application processor) capable of executing corresponding operations by using at least one software program stored in a memory device.

The terms used in the present disclosure are to merely describe a specific embodiment and are not intended to limit the scope of other embodiments. A singular form may include a plural form. All the terms including a technical or scientific term may have the same meaning as terms generally understood by those skilled in the prior art. The terms defined in a general dictionary may be interpreted as having the same or similar meaning in a context of related technology and are not interpreted abnormally or excessively unless clearly defined in the present disclosure. According to situations, the terms defined in the present disclosure cannot be interpreted as excluding the embodiments of the present disclosure.

An electronic device according to various embodiments of the present disclosure may be a device including a projection function. For example, the electronic device may be one or a combination of a smart phone, a tablet personal computer (PC), a mobile phone, a video phone, an e-book reader, a desktop PC, a laptop PC, a netbook computer, a personal digital assistant (PDA), a camera, a wearable device (for example, a head-mounted-device (HMD) such as electronic glasses, electronic clothes, and electronic bracelet, an electronic necklace, an electronic appcessary, an electronic tattoo, and a smart watch.

According to some embodiments, the electronic device may be a smart home appliance having a projection function. The smart home appliance may include at least one of a television (TV), a digital video disk (DVD) player, an audio player, an air conditioner, a cleaner, an oven, a microwave oven, a washing machine, an air cleaner, a set-top box, a TV box (for example, SAMSUNG HOMESYNC, APPLE TV, or GOOGLE TV), game consoles, an electronic dictionary, an electronic key, a camcorder, and an electronic frame.

According to some embodiments of the present disclosure, the electronic device may include at least one of various types of medical devices (for example, magnetic resonance angiography (MRA), magnetic resonance imaging (MRI), computed tomography (CT), a scanner, an ultrasonic device and the like), a navigation device, a global positioning system (GPS) receiver, an event data recorder (EDR), a flight data recorder (FDR), a vehicle infotainment device, electronic equipment for a ship (for example, a navigation device for ship, a gyro compass and the like), avionics, a security device, a head unit for a vehicle, an industrial or home robot, an automatic teller machine (ATM) of financial institutions, and a point of sale (POS) device of shops.

According to some embodiments of the present disclosure, the electronic device may include at least one of furniture or a part of a building/structure, an electronic board, an electronic signature receiving device, a projector, and various types of measuring devices (for example, a water meter, an electricity meter, a gas meter, a radio wave meter and the like) including a projection function. The electronic device according to various embodiments of the present disclosure may be one or a combination of the above described various devices. Further, the electronic device according to various embodiments of the present disclosure may be a flexible device. It is apparent to those skilled in the art that the electronic device according to various embodiments of the present disclosure is not limited to the above described devices. Hereinafter, an electronic device according to various embodiments of the present disclosure will be described with reference to the accompanying drawings. The term "user" used in various embodiments may refer to a person who uses an electronic device or a device (for example, an artificial intelligence electronic device) which uses an electronic device.

FIG. 1 is a block diagram illustrating a network according to various embodiments of the present disclosure.

Referring to FIG. 1, an electronic device 101 in a network 100 is disclosed according to various embodiments of the present disclosure. The electronic device may include a bus 110, processor 120, memory 130, input/output interface 150, display 160, and communication interface 170. In an embodiment of the present disclosure, the electronic device 101 may omit at least one of the above components or additionally include other components.

The bus 110 may be a circuit connecting the above described components and transmitting communication (for example, a control message) between the above described components.

The processor 120 receives commands from other components (for example, the memory 130, the input/output interface 150, the display 160, or the communication interface 170) through the bus 110, analyzes the received commands, and executes calculation or data processing according to the analyzed commands.

The processor 120 receives commands from other components (for example, the memory 130, the input/output interface 150, the display 160, or the communication interface 160) through the bus 110, analyzes the received commands, and executes calculation or data processing according to the analyzed commands.

In an exemplary embodiment, the processor 120 may be configured to receive at least two touch inputs when the display 160 is in a locked state and release the locked state if the inputs are identical to a pre-stored pattern. The processor can receive a first touch input through the display 160 in a lock sate of the display 160 and receives a second touch input after receiving the first touch input. The processor identifies whether the second touch input is in a selected area based on at least one imaginary axis crossing the location of the first touch input and decides that the touch inputs are identical to the stored pattern based on the result of identifying.

According to various embodiments of the present disclosure, the processor 120 may be configured to determine that the touch inputs are in a selected area by identifying whether an angle between the imaginary axis and an imaginary line connecting the first touch input and the second touch input is in a selected area. The processor 120 may be configured to receive a third touch input after receiving the second touch input, identify whether the third touch input is in a selected area based on another imaginary axis crossing the location of the second touch input, and decide that the touch inputs are identical to the stored pattern based on the result of identifying.

The memory 130 may include a volatile and/or non-volatile memory. For example, the memory can store command or data related to at least one component of the electronic device 101. According to an embodiment of the present disclosure, the memory 130 can store software and/or program 140. For example, the program 140 may include a kernel 141, middleware 143, an application programing interface (API) 145, and/or an application program (or "application") 147. At least one of the kernel 141, the middleware 143, and the API 145 may be considered an operating system (OS).

The kernel 141 controls or manages system resources (for example, the bus 110, the processor 120, or the memory 130) used for executing an operation or function implemented by the remaining other programming modules, for example, the middleware 143, the API 145, or the application 147. Further, the kernel 141 provides an interface for accessing individual components of the electronic device 101 from the middleware 143, the API 145, or the application 147 to control or manage the components.

The middleware 143 performs a relay function of allowing the API 145 or the application 147 to communicate with the kernel 141 to exchange data. Further, in operation requests received from the application 147, the middleware 143 performs a control for the operation requests (for example, scheduling or load balancing) by using a method of assigning a priority, by which system resources (for example, the bus 110, the processor 120, the memory 130, and the like) of the electronic device 101 can be used, to the application 147.

The API 145 is an interface by which the application 147 can control a function provided by the kernel 141 or the middleware 143 and includes, for example, at least one interface or function (for example, command) for a file control, a window control, image processing, or a character control.

The input/output interface 150 may transmit a command or data input by a user or other external devices to other components of the electronic device 101. Further, the input/output interface 150 can output a command or data received from other components of the electronic device 101 to a user or other external devices.

The display 160 may include a liquid crystal display (LCD), light emitting diode (LED) display, organic light emitting diode (OLED) display, micro electromechanical systems (MEMS) display, or electronic paper display. The display 160 can display various contents such as a text, image, video, icon, and/or symbol. The display 160 may include a touch screen and can receive a touch, gesture, proximity, or hovering input by using an electronic pen or a part of a user's body.

The communication interface 170 connects communication between the electronic device 101 and the external device (for example, electronic device 104 or server 164). For example, the communication interface 170 may access a network 162 through wireless or wired communication to communicate with the external device. The wireless communication includes at least one of, for example, Wi-Fi, bluetooth (BT), near field communication (NFC), a GPS, and cellular communication (for example, long-term evolution (LTE), long-term evolution advanced (LTE-A), code division multiple access (CDMA), wideband code division multiple access (WCDMA), UMTS, WiBro or GSM). The wired communication may include at least one of, for example, a universal serial bus (USB), a high definition multimedia interface (HDMI), recommended standard 232 (RS-232), and a plain old telephone service (POTS).

A first external electronic device 102 and a second external electronic device 104 respectively may be the same type as the electronic device 101 or a different type of device. According to an embodiment of the present disclosure, the server 164 may include at least one group of servers. According to various embodiments of the present disclosure, the whole or a part of operations executed in the electronic device 101 can be executed in another or a plurality of electronic device (for example, electronic device 102, electronic device 104, or server 164). According to an embodiment of the present disclosure, when the electronic device is required to execute a function or a service automatically or according to a request, the electronic device may not execute the function or service by itself and additionally request other devices (for example, electronic device 102, electronic device 104, or server 164) for at least a part of related functions. The other devices (for example, electronic device 102, electronic device 104, or server 164) can execute the requested or additional function and transmit the result of execution to the electronic device 101. The electronic device 101 can provide the requested function or service by processing the result as it is or additionally. For this, a cloud computing, distribution computing, or client-server computing technology can be utilized.

Figure 2:
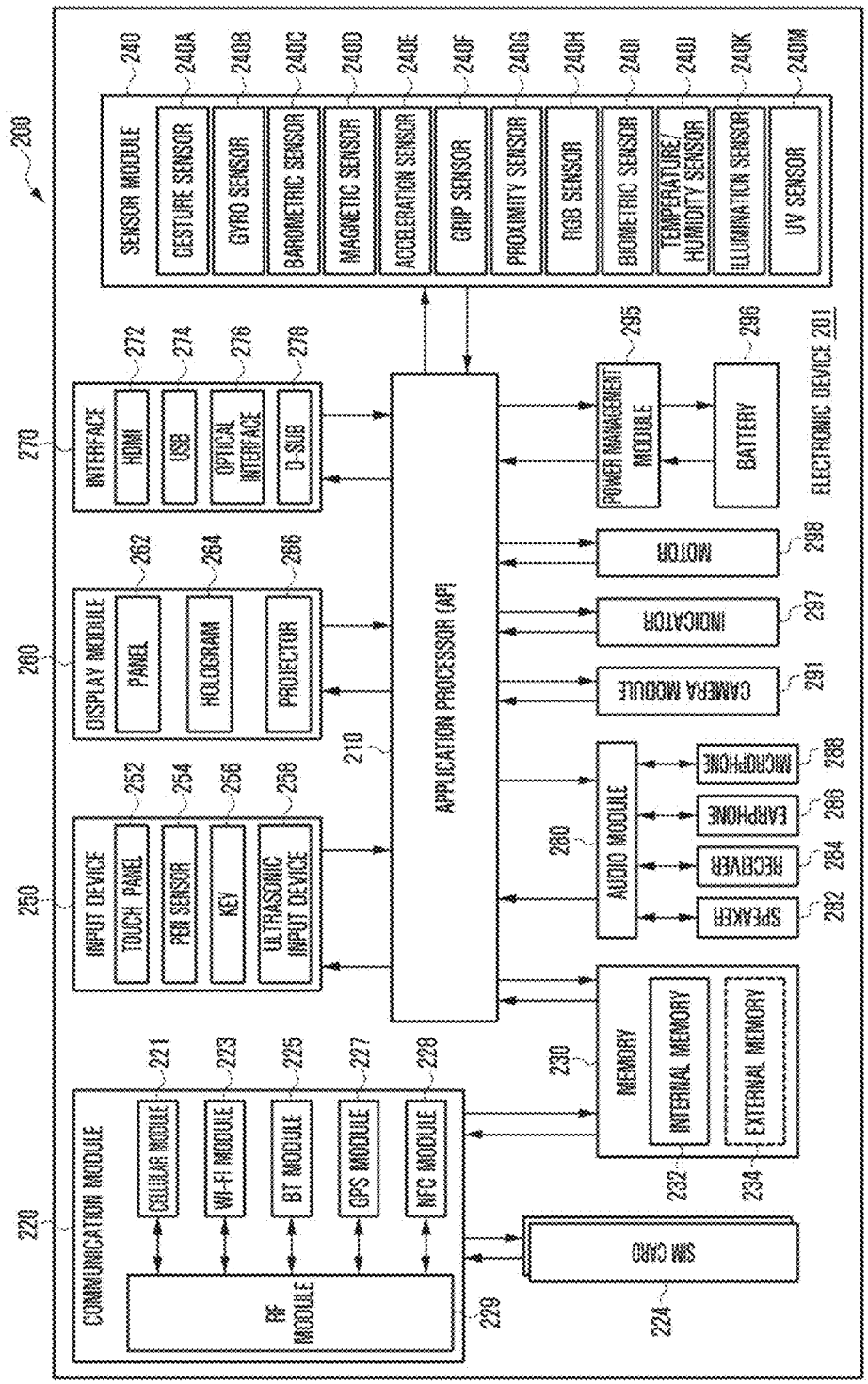
FIG. 2 is a block diagram illustrating a configuration of an electronic device according to various embodiments of the present disclosure.

FIG. 2 is a block diagram 200 of an electronic device 201 according to various embodiments of the present disclosure.

The electronic device 201 may configure, for example, a whole or a part of the electronic device 101 illustrated in FIG. 1.

Referring to FIG. 2, the electronic device 201 includes one or more application processors (APs) 210, a communication module 220, a subscriber identification module (SIM) card 224, a memory 230, a sensor module 240, an input device 250, a display 260, an interface 270, an audio module 280, a camera module 291, a power managing module 295, a battery 296, an indicator 297, and a motor 298.

The AP 210 operates an operating system (OS) or an application program so as to control a plurality of hardware or software component elements connected to the AP 210 and execute various data processing and calculations including multimedia data. The AP 210 may be implemented by, for example, a system on chip (SoC). According to an embodiment, the processor 210 may further include a graphic processing snit (GPU). The processor 210 may further include a projecting management module.

The communication module 220 includes a cellular module 221, a Wi-Fi module 223, a bluetooth (BT) module 225, a global positioning system (GPS) module 227, a near field communication (NFC) module 228, and a radio frequency (RF) module 229.

The cellular module 221 provides a voice, a call, a video call, a short message service (SMS), or an Internet service through a communication network (for example, LTE, LTE-A, CDMA, WCDMA, UMTS, WiBro, GSM or the like). Further, the cellular module 221 may distinguish and authenticate electronic devices within a communication network by using a subscriber identification module (for example, the SIM card 224). According to an embodiment, the cellular module 221 performs at least some of the functions which can be provided by the AP 210. For example, the cellular module 221 may perform at least some of the multimedia control functions.

Each of the Wi-Fi module 223, the BT module 225, the GPS module 227, and the NFC module 228 may include, for example, a processor for processing data transmitted/received through the corresponding module. Although the cellular module 221, the Wi-Fi module 223, the BT module 225, the GPS module 227, and the NFC module 228 are illustrated as blocks separate from each other in FIG. 2, at least some (for example, two or more) of the cellular module 221, the Wi-Fi module 223, the BT module 225, the GPS module 227, and the NFC module 228 may be included in one integrated chip (IC) or one IC package according to one embodiment.

The RF module 229 transmits/receives data, for example, an RF signal. Although not illustrated, the RF module 229 may include, for example, a transceiver, a power amp module (PAM), a frequency filter, a low noise amplifier (LNA) or the like. Further, the RF module 229 may further include a component for transmitting/receiving electronic waves over a free air space in wireless communication, for example, a conductor, a conducting wire, or the like. Although the cellular module 221, the Wi-Fi module 923, the BT module 225, the GPS module 227, and the NFC module 228 share one RF module 229 in FIG. 2, at least one of the cellular module 221, the Wi-Fi module 223, the BT module 225, the GPS module 227, and the NFC module 228 may transmit/receive an RF signal through a separate RF module according to one embodiment.

The SIM card 224 is a card including a subscriber identification module and may be inserted into a slot formed in a particular portion of the electronic device. The SIM card 224 includes unique identification information (for example, integrated circuit card identifier (ICCID)) or subscriber information (for example, international mobile subscriber identity (IMSI).The memory 230 (for example, memory 130) may include an internal memory 232 and/or an external memory 234. The internal memory 232 may include, for example, at least one of a volatile memory (for example, a random access memory (RAM), a dynamic RAM (DRAM), a static RAM (SRAM), a synchronous dynamic RAM (SDRAM), and the like), and a non-volatile memory (for example, a read only memory (ROM), a one time programmable ROM (OTPROM), a programmable ROM (PROM), an erasable and programmable ROM (EPROM), an electrically erasable and programmable ROM (EEPROM), a mask ROM, a flash ROM, a NAND flash memory, an NOR flash memory, and the like).

According to an embodiment of the present disclosure, the internal memory 232 may be a solid state drive (SSD). The external memory 234 may further include a flash drive, for example, a compact flash (CF), a secure digital (SD), a micro SD (Micro-SD), a mini SD (Mini-SD), an extreme digital (xD), or a memory stick. The external memory 234 may be functionally connected to the electronic device 201 through various interfaces. According to an embodiment, the electronic device 201 may further include a storage device (or storage medium) such as a hard drive.

The sensor module 240 measures a physical quantity or detects an operation state of the electronic device 201 and converts the measured or detected information to an electronic signal. The sensor module 240 may include, for example, at least one of a gesture sensor 240A, a gyro sensor 240B, an atmospheric pressure (barometric) sensor 240C, a magnetic sensor 240D, an acceleration sensor 240E, a grip sensor 240F, a proximity sensor 240G, a color sensor 240H (for example, red, green, and blue (RGB) sensor) 240H, a biometric sensor 240I, a temperature/humidity sensor 240J, an illumination (light) sensor 240K, and a ultra violet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an infrared (IR) sensor, an iris sensor, a fingerprint sensor (not illustrated), and the like. The sensor module 240 may further include a control circuit for controlling one or more sensors included in the sensor module 240.

The input device 250 includes a touch panel 252, a (digital) pen sensor 254, a key 256, and an ultrasonic input device 258. For example, the touch panel 252 may recognize a touch input in at least one type of a capacitive type, a resistive type, an infrared type, and an acoustic wave type. The touch panel 252 may further include a control circuit. In the capacitive type, the touch panel 252 can recognize proximity as well as a direct touch. The touch panel 252 may further include a tactile layer. In this event, the touch panel 252 provides a tactile reaction to the user.

The (digital) pen sensor 254 may be implemented, for example, using a method identical or similar to a method of receiving a touch input of the user or using a separate recognition sheet. The key 256 may include, for example, a physical button, an optical key, or a key pad. The ultrasonic input device 258 is a device which can detect an acoustic wave by a microphone (for example, microphone 288) of the electronic device 201 through an input means generating an ultrasonic signal to identify data and can perform wireless recognition.

The display 260 (for example, display 150) includes a panel 262, a hologram device 264, and a projector 266. The panel 262 may be, for example, a LCD or an active matrix organic light emitting diode (AM-OLED). The panel 262 may be implemented to be, for example, flexible, transparent, and/or wearable. The panel 262 may be configured by the touch panel 252 and one module. The hologram device 264 shows a stereoscopic image in the air by using interference of light. The projector 266 projects light on a screen to display an image. For example, the screen may be located inside or outside the electronic device 201. According to an embodiment, the display 260 may further include a control circuit for controlling the panel 262, the hologram device 264, and the projector 266.

The interface 270 includes, for example, a high-definition multimedia interface (HDMI) 272, a universal serial bus (USB) 274, an optical interface 276, and a d-subminiature (D-sub) 278. The interface 270 may be included in, for example, the communication interface 170 illustrated in FIG. 1. Additionally or alternatively, the interface 290 may include, for example, a mobile high-definition link (MHL) interface, a SD card/multi-media card (MMC), or an Infrared Data Association (IrDA) standard interface.

The audio module 280 bi-directionally converts a sound into an electronic signal. At least some components of the audio module 280 may be included in, for example, the input/output interface 150 illustrated in FIG. 1. The audio module 280 processes sound information input or output through, for example, a speaker 282, a receiver 284, an earphone 286, the microphone 288, or the like.

The camera module 291 is a device which can photograph a still image and/or a video. According to an embodiment, the camera module 291 may include one or more image sensors (for example, a front sensor or a back sensor), an image signal processor (ISP) (not shown) or a flash (for example, an LED or xenon lamp).

The power managing module 295 manages power of the electronic device 201. Although not illustrated, the power managing module 295 may include, for example, a power management integrated circuit (PMIC), a charger integrated circuit (IC), or a battery or fuel gauge.

The PMIC may be mounted to, for example, an integrated circuit or a SoC semiconductor. A charging method may be divided into wired and wireless methods. The charger IC charges a battery and prevents over voltage or over current from flowing from a charger. According to an embodiment, the charger IC includes a charger IC for at least one of the wired charging method and the wireless charging method. The wireless charging method may include, for example, a magnetic resonance method, a magnetic induction method and an electromagnetic wave method, and additional circuits for wireless charging, for example, circuits such as a coil loop, a resonant circuit, a rectifier, or the like may be added. The battery fuel gauge measures, for example, a remaining quantity of the battery 296, or a voltage, a current, or a temperature during charging. The battery 296 may store or generate electricity and supply power to the electronic device 201 by using the stored or generated electricity. The battery 296 may include a rechargeable battery or a solar battery.

The indicator 297 shows particular statuses of the electronic device 201 or a part (for example, AP 210) of the electronic device 201, for example, a booting status, a message status, a charging status, and the like. The motor 298 converts an electrical signal to a mechanical vibration. Although not illustrated, the electronic device 201 may include a processing unit (for example, GPU) for supporting a module TV. The processing unit for supporting the mobile TV may process, for example, media data according to a standard of digital multimedia broadcasting (DMB), digital video broadcasting (DVB), media flow, or the like.

Each of the components of the electronic device according to various embodiments of the present disclosure may be implemented by one or more components and the name of the corresponding component may vary depending on a type of the electronic device. The electronic device according to various embodiments of the present disclosure may include at least one of the above described components, a few of the components may be omitted, or additional components may be further included. Also, some of the components of the electronic device according to various embodiments of the present disclosure may be combined to form a single entity and thus may equivalently execute functions of the corresponding components before being combined.

Figure 3:
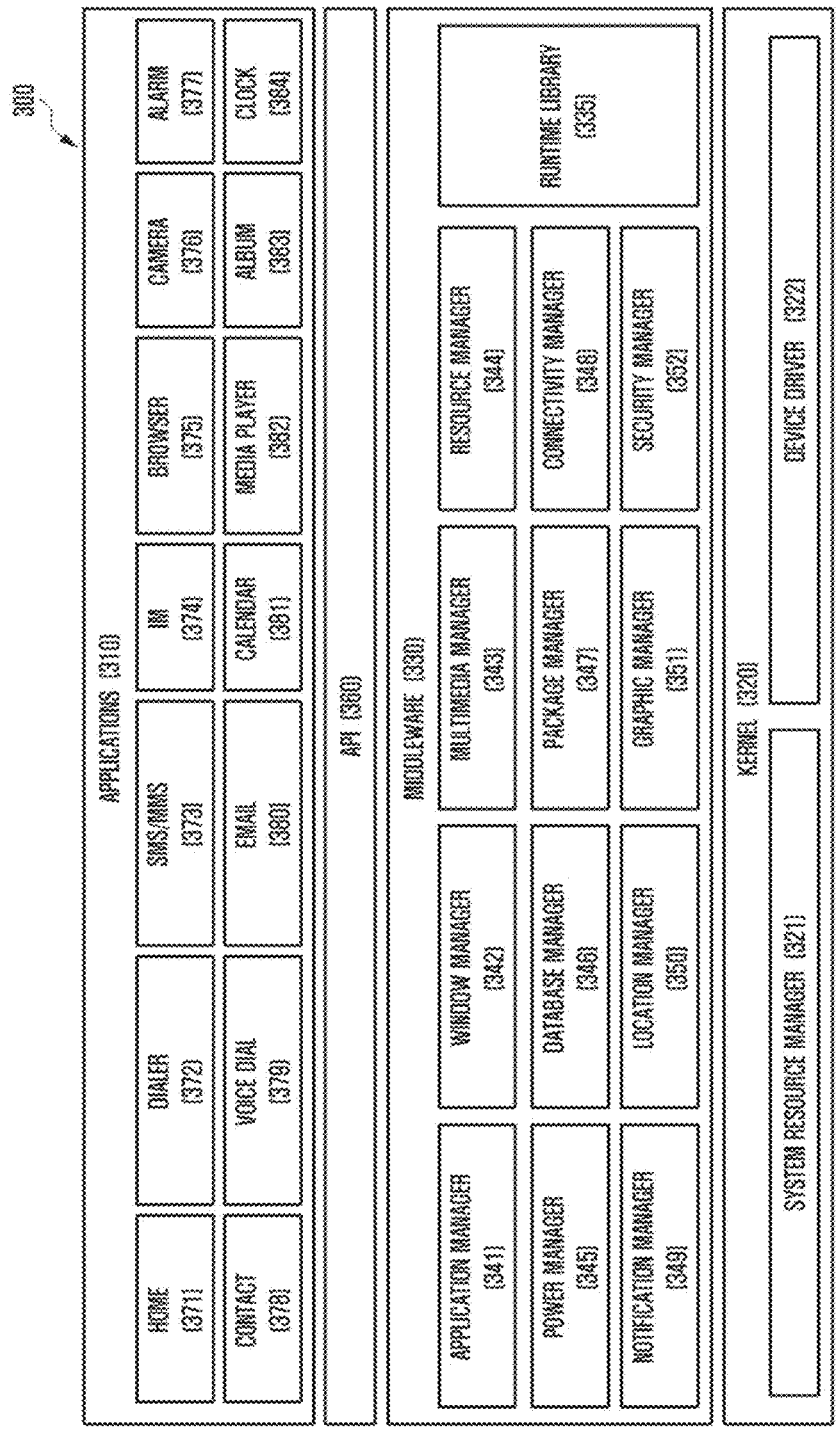
FIG. 3 is a block diagram illustrating a configuration of a program module according to various embodiments of the present disclosure.

FIG. 3 illustrates a block diagram of a program module 300 according to various embodiments of the present disclosure.

According to an embodiment of the present disclosure, the program module 300 (for example, program 140) may include an operating system (OS) for controlling resources of the electronic device 101 and various applications 310 (for example, application program 147) being executed in the operating system. The operating system may be one of Android, iOS, Windows, Symbian, Tizen, or Bada.

The program module 300 may include a kernel 320, middleware 330, API 360, and/or applications 310. At least a portion of the program module 300 may be preloaded in an electronic device or downloaded from a server (for example, server 164).

The kernel 320 (for example, kernel 141 of FIG. 1) may include a system resource manager 321 or a device driver 322. The system resource manager can execute a control, allocation, and reclaim of system resources. According to an embodiment of the present disclosure, the system resource manager 321 may include a process manager, memory manager, or file system manager. The device driver 322 may include a display driver, camera driver, Bluetooth driver, shared memory driver, USB driver, keypad driver, Wi-Fi driver, audio driver, or inter-process communication (IPC).

The middleware 330 provides a function commonly required for the applications 310, or provides various functions for the applications 310 through the API 360 so that the applications 310 can effectively use limited system resources in the electronic device. According to an embodiment of the present disclosure, the middleware 330 (for example, middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include a library module used by a compiler for adding new functions through a programming language while the applications 310 are being executed. The runtime library 335 can execute functions for input/output management, memory management, or calculation.

The application manager 341 can manage a life cycle of at least one of the applications 310. The window manager 342 can manage GUI resources used for a screen. The multimedia manager 343 can identify a format required for playing various media files and execute encoding or decoding of the media files by using a corresponding codec for the format. The resource manager 344 can manage resources of a source code, memory, or storage space of at least one application.

The power manager 345 can manage a battery or a power source by operating with a basic input/output system (BIOS) and provide electric power information required for operations of an electronic device. The database manager can generate, search, or modify a database to be used for at least one of the applications 370. The package manager can manage installation or update of an application distributed in a package form.

The connectivity manager 348 can manage a wireless connection of Wi-Fi or Bluetooth. The notification manager 349 can inform or notify a user of events such as an arrival message, appointment, or proximity notice in a method of not disturbing the user. The location manager 350 can manage location information of an electronic device. The graphic manager 351 can manage a graphic effect to be provided for a user and a related user interface. The security manager 352 can provide a general security function required for a system security or a user authentication. According to an embodiment of the present disclosure, if the electronic device (for example, electronic device 101) includes a telephone function, the middleware 330 may further include a telephony manager to manage a voice or video telephone function of the electronic device. The middleware 330 may include middleware modules forming a combination of various functions for the above components. The middleware 330 can provide a specialized module corresponding to an operating system in order to provide differentiated functions. Further, the middleware 330 can dynamically omit some of the existing components or add new components.

The API 360 (for example, API 145) is a set of API programming functions and can be differently configured according to an operating system. For example, in case of Android or iOS, one API set can be provided for each platform, and in case of Tizen, more than one AI set can be provided for each platform.

The applications 310 (for example, application program 147) may include at least one application for functions such as a home 371, a dialer 372, SMS/MMS 373, IM (instant messaging) 374, a browser 375, a camera 376, an alarm 377, a contact 378, a voice dial 379, email 380, a calendar 381, a media player 382, an album 383, and a clock 384. Other types of applications may further be included such as health care applications (for example, measurement of activity quantity or blood sugar, etc.) and environmental information service applications (for example, air pressure, humidity, temperature information, etc.).

According to an embodiment of the present disclosure, the applications 310 may include an application (hereafter, "information exchange application") for supporting an information exchange between the electronic device (for example, electronic device 101) and the external electronic devices (for example, electronic device 102 and 104). The information exchange application may include a notification relay application for transmitting specific information to the external electronic devices or a device management application for managing the external electronic devices.

For example, the notification relay application may include a function of transmitting notification information generated by another application (for example, an SMS/MMS application, an email application, a health care application, or an environmental information application) of the electronic device to the external electronic devices (for example, electronic devices 102 and 104). Further, the notification relay application can provide notification information to a user based on information received from the external electronic devices. The device management application can manage (for example, install, delete, or update) at least one function (for example, control of turn-on/turn-off, brightness, or resolution) of the external electronic device (for example, electronic device 104) communicating with the electronic device, application operating in the external electronic device, or a service (for example, telephone service or message service) provided by the external electronic device.

According to an embodiment of the present disclosure, the applications 310 may include a designated application (for example, a health care application) according to an attribute (for example, type of mobile medical equipment) of an external electronic device (for example, electronic devices 102 and 104). According to an embodiment of the present disclosure, the applications 310 may include an application received from an external electronic device (for example, server 164, or electronic devices 102 and 104). According to an embodiment of the present disclosure, the applications 310 may include a preloaded application or a third party application downloadable from a server. The names of components of the program module 300 according to an illustrated embodiment may differ according to the type of operating system.

According to various embodiments of the present disclosure, at least a portion of the program module 300 may be configured with software, firmware, hardware, or their combinations. At least a portion of the program module 300 can be implemented or executed by a processor (for example, AP 210). At least a portion of the program module 300 may include a module, program, routine, set of instructions, or process in order to execute at least one function.

The term "module" used in the present disclosure may refer to, for example, a unit including at least one combination of hardware, software, and firmware. The "module" may be interchangeably used with a term, such as unit, logic, logical block, component, and/or circuit. The "module" may be a minimum unit of an integrally configured article and/or a part thereof. The "module" may be a minimum unit performing at least one function and/or a part thereof. The "module" may be mechanically and/or electronically implemented. For example, the "module" according to the present disclosure may include at least one of an application-specific IC (ASIC) chip, a field-programmable gate arrays (FPGA), and a programmable-logic device for performing operations which has been known and/or are to be developed hereinafter. According to various embodiments, at least some of the devices (for example, modules or functions thereof) or the method (for example, operations) according to the present disclosure may be implemented by a command stored in a computer-readable storage medium in a programming module form. When the instructions are executed by at least one processor (e.g., the processor 120), the at least one processor may perform functions corresponding to the instructions. The computer-readable storage medium may be, for example, the memory 130.

The computer-readable recording medium may include magnetic media such as a hard disk, a floppy disk, and a magnetic tape, optical media such as a compact disc ROM (CD-ROM) and a DVD, magneto-optical media such as a floptical disk, and hardware devices specially configured to store and perform a program instruction (for example, programming module), such as a ROM, a RAM, a flash memory and the like. In addition, the program instructions may include high class language codes which can be executed in a computer by using an interpreter as well as machine codes made by a compiler. The aforementioned hardware device may be configured to operate as one or more software modules in order to perform the operation of the present disclosure and vice versa.

The module or program module 300 according to various embodiments of the present disclosure may include at least one of the above components, omit some of them, or include additional components. Operations can be executed by the module, program module, or other components in a sequential, parallel, repeating, or heuristic method according to various embodiments of the present disclosure. Further, some operations may be executed in a different sequence or omitted, and some other operation may be added.

The embodiments of the present disclosure have been made for the explanation and understanding of the technical contents, and does not limit the scope of the present disclosure. Therefore, it should be understood that many variations and modifications of the embodiments can be included within the spirit and scope of the present disclosure The present embodiment relates to a method for variously using an obtained blank area if the size of output content and the size of screen are not identical. In order to utilize a blank area, if the content is output in the center of screen and blank areas are equally divided at the right and left sides and/or top and bottom sides. The present embodiment can configure the blank areas to one area by moving the content to the blank area. By this, various functions which cannot be executed in a small area are enabled to execute in the configured blank area.

For example, in an embodiment, a notification can be displayed without covering or overlapping a content screen by displaying the notification in a blank area. Further, to second or third application may be executed without interrupting the content being output through a screen by displaying a content marking, image search, browser, notepad, or messenger in the blank area. Further, various applications may be displayed within the blank area. A display mode associated with a screen movement event may be changed by defining the screen movement for securing a blank area as an event. In addition, a state of the blank area may be determined and the screen movement event may be processed differently based on the state of the blank area.

Further, the blank area may be displayed in various colors related to the currently content being output. In contrast, the blank area is displayed in a black or single color in the prior art. Various special effects may be displayed in the blank area and various functions may be displayed in the blank area based on the current location of user.

Hereafter, the present disclosure discloses various methods of mode switching according to a screen movement event and using a blank area secured after moving the screen. In particular, various marking methods are disclosed in relation to the method for using a blank area after moving the screen. Further, various embodiments are described for using a larger secured blank area regardless of the screen movement. However, the present disclosure may not be implemented in the above order and each method can be used independently or in different orders.

Figure 4:
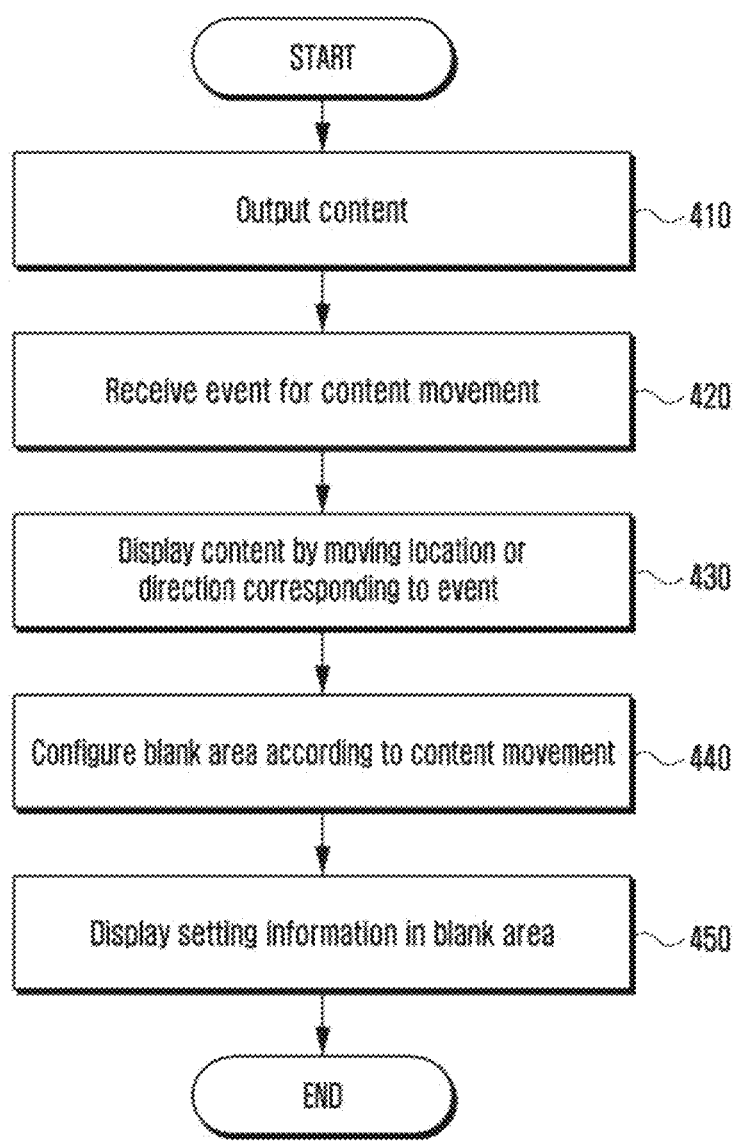
FIG. 4 is a flowchart illustrating a method for using a blank area in a screen according to various embodiments of the present disclosure.

FIG. 4 is a flowchart illustrating a method for using a blank area in a screen according to various embodiments of the present disclosure.

The method for using a blank area of FIG. 4 can be performed by an electronic device 101 of FIG. 1 or by an electronic device 201 of FIG. 2. For the convenience in description, it is assumed that the method is performed by the electronic device 101 of FIG. 1, however the present disclosure is not limited to the electronic device 101 of FIG. 1. The electronic device 101 according to the present disclosure can be configured with a touch screen integrated with an input/output interface 150 and a display 160. For the convenience in description, the display 160 is assumed to be a touch screen.

The processor 120 outputs content at operation 410. The content may include at least one of a text, image, audio, video, icon, symbol, etc. Hereafter, the content is assumed to be a 'video', however the content is not limited to a video. Outputting the content may mean that the content is output through the display 160 or a sound or vibration is output through the input/output interface 150. The processor 120 can display content in the center of the screen of the display 160 and display blank areas evenly on both right and left sides and/or along both the top and bottom sides. The blank area is an area where the content is not displayed and the display 160 may display the blank area in a black color or other single color.

The processor 120 receives or detects an event associated with moving the content at operation 420. The event may be a touch, a gesture, a proximity or hovering input using an electronic pen or a part of user's body, etc. For example, while the content is displayed in the display 160, the event may be generated by moving upwards, downwards, rightwards, or leftwards and releasing after touching the display 160. The operations of touching, moving, and releasing may be interpreted as a drag and drop operation.

If a touch is detected from the display 160 while outputting a video, the processor 120 displays an indicator associated with a function related to the content being output. If the content is a video, the function indicator related to the content may be associated with a play, temporary stop, stop, fast forward, or rewind function. If a touch is detected, the processor 120 displays a function indicator related to content being output in the display 160 and may not display the function indicator if a movement of touch is detected. Alternatively, if a touch is detected and the movement of touch is detected within a predetermined time, the processor 120 may not display a function indicator related to the content being output in the display 160. Namely, the processor 120 may not display a function indicator related to the detection of touch from the beginning.

The processor 120 displays the content by moving to a location or in a direction corresponding to the event at operation 430. Namely, the processor 120 can move a display location or direction of the content based on the detected event. The processor 120 can modify the location of the content to the right or left even though the movement direction is not horizontal. In case of horizontal movement, the y-coordinate does not change and only the x-coordinate changes. If blank areas exist at the right and left sides of the content, the processor 120 can move the content to the right or left according to the movement direction. Similarly, the processor 120 can modify the location of the content to the upper or lower side even though the movement direction is not vertical. In case of vertical movement, the x-coordinate does not change and only the y-coordinate changes. If blank areas exist at the upper and lower sides of the content, the processor 120 can modify the location of the content upwards or downwards according to the movement direction.

According to various embodiments of the present disclosure, the processor 120 can move the content to a location by subdividing the location. The processor 120 can subdivide the location according to the screen size of the display 160. For example, processor 120 can distinguish five different locations such as a right, half right, middle, half left, and left. Alternatively, the processor 120 can display setting information in the blank area according to a movement speed of content. Here, the processor 120 may give a notice to a user in order to easily move the content corresponding to a location or direction. For example, if the content moves to a predetermined location or in a predetermined direction, the processor 120 can provide a notice in forms of vibration, sound, or graphical user interface (GUI). Further, if a movement range (or movement speed) is less than a predetermined value, the processor 120 can return the content to the initial location associated with the content. If the movement range (or movement speed) is greater than the predetermined value, the processor 120 can move the content to a displaced location or in a displaced direction. The movement range can be set according to the subdivided location.

The processor 120 configures the blank area according to the detected movement of content at operation 440. If the movement of content is completed, the processor 120 can configure a new blank area by combining blank areas disposed at the upper, lower, right, and left sides of the content. In an exemplary embodiment, the blank area is distinguished from a divided blank area where the blank area is divided into two or more areas and may mean an area configured as much as each divided blank area. The blank area may be same as the sum of the blank areas divided into the upper and lower sides and/or right and left sides or the blank areas may not be identical (e.g., the area of one or more blank areas may be different). For example, if the movement of content is completed, the processor 120 can adjust an image ratio of the output content. If the image ratio of content is adjusted, the size of new blank area may not be same as the sum of divided blank areas. For the convenience in description, after completing the movement of content, an area of displaying the content may be interpreted as a first area and the new blank area as a second area. The sum of the first area and the second area may be same as the total area of the display 160.

The processor 120 displays setting information in the blank area at operation 450. The setting information may include a function, application, program, icon, and/or symbol. The setting information may be set as a default in the electronic device 101 or configured by a user. For example, if a blank area is configured in the right side by moving the content to the left side, the setting information may display a Korean caption and a touch lock may be set automatically. Alternatively, the setting information may include an instant messenger such as Kakao Talk and Chat-on, browser, message, and push notification service.

Further, if a blank area is configured at the left side by moving the content to the right side, the setting information may display an English caption and a touch unlock may be set automatically. Alternatively, the setting information may display a clock, current location, or an application executing in a background.

In an exemplary embodiment, the processor 120 may display a list including executable functions in the blank area and execute and display a function selected by a user. In this case, the processor 120 can execute and display various functions in the configured blank area without influencing a display area associated with outputting the content.

According to various embodiments of the present disclosure, the processor 120 can designate a display mode each for movement of content and setting information corresponding to the movement of content and change the display mode according to the movement of content. For example, if the content is displayed in the center of display 160, the processor 120 may set a 'normal mode'. If a blank area is configured at the right side by moving the content to the left side, the processor 120 may set a 'right mode'. If a blank area is configured at the left side by moving the content to the right side, the processor 120 may set a 'left mode'. The processor 120 can operate in one of the display modes (general mode, right mode, and left mode) according to the movement of content.

Figure 5:
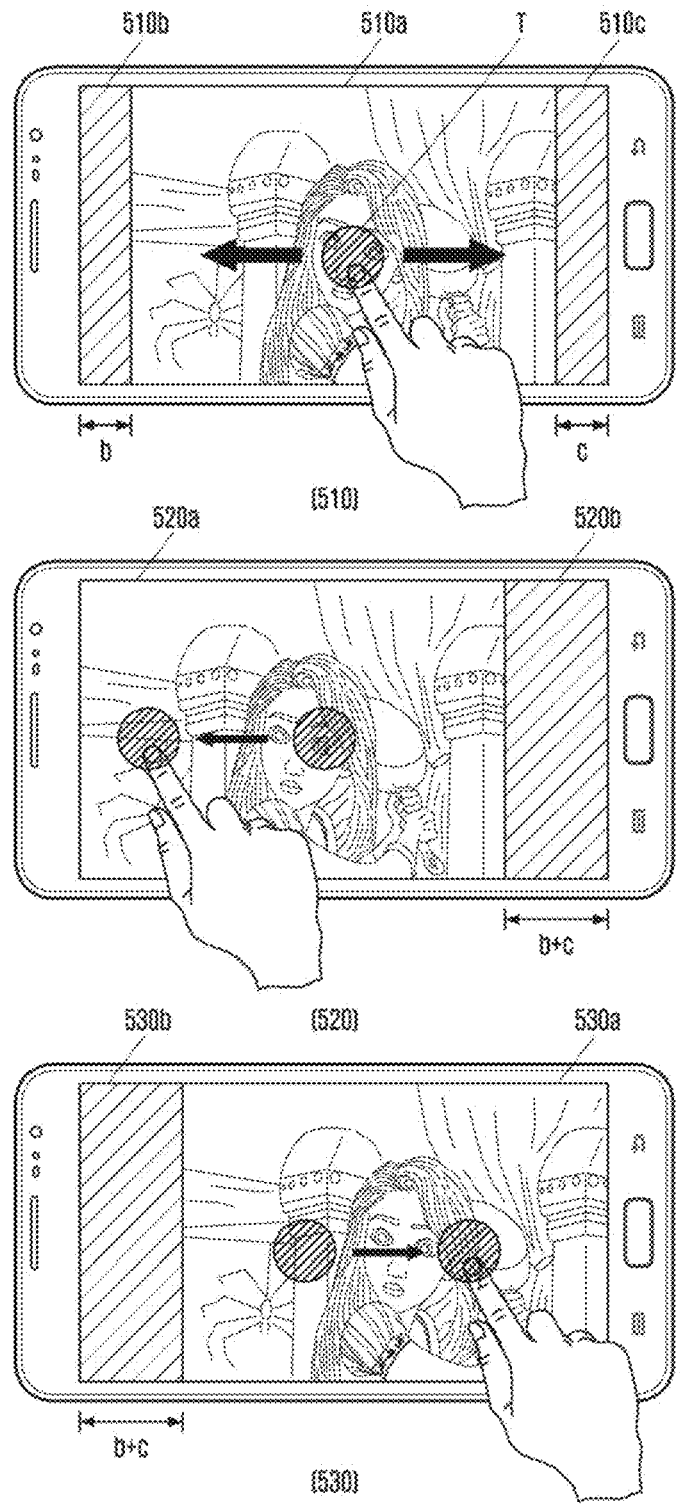
FIG. 5 illustrates screen examples of configuring a blank area by moving content according to various embodiments of the present disclosure.

FIG. 5 illustrates screen examples of configuring a blank area by moving content according to various embodiments of the present disclosure.

Referring to FIG. 1 and FIG. 5, if the screen ratio of is 21:9 and the image ratio of the content is 16:9, the processor 120 can display the content in the center of display 160 and output blank areas at predetermined parts of the right and left sides. Reference number 510 illustrates a normal mode outputting content in the center of display 160. The normal mode may operate without a caption and with a basic setting. Reference number 510a indicates an area where content is displayed, reference number 510b indicates a left blank area, and reference number 510c indicates a right blank area. When locating or orienting the electronic device 101 horizontally, the width of left blank area 510b is 'b', and the width of right blank area 510c is 'c'. If a user touches the content as shown by reference number 'T' and drags leftwards or rightwards, the processor 120 can move the content in to the dragged direction.

Reference number 520 illustrates a right mode where the content is displayed by modifying the location of the content to the left side of the display 160, if the user touches the content and drags leftwards. Referring to reference number 520, the blank area initially provided at the left side in normal mode 510 disappears and a new blank area 520b is configured by combining the left blank area and the right blank area. Reference number 520a indicates an area where the content is displayed and reference number 520b indicates a blank area. In an exemplary embodiment, the width of the blank area 520*b* may be same as the sum 'b+c' of the width of left blank area 'b' and the width of right blank area 'c'. In the right mode, the processor 120 can display the content in a 2D mode, display a Korean caption in the blank area 520*b*, and switch to a locked mode such that a touch event cannot be received.

Reference number 530 illustrates a left mode outputting the content by moving to the right side of the display 160 if the user touches the content and drags rightwards. Referring to reference number 530, the blank area initially existed at the right side disappears and a new blank area is configured by combining the left blank area and the right blank area. Reference number 530*a* indicates an area where the content is displayed and reference number 530*b* indicates a blank area. In the left mode 530, the processor 120 can display the content in a 3D mode, display an English caption in the blank area 530*b*, and switch to an unlock mode such that a touch input can be received. The width of the blank area 530*b* may be same as the sum 'b+c' of the width of left blank area 'b' and the width of right blank area 'c'.

In an exemplary embodiment, the processor 120 can switch between various function modes such as a play, stop, sound output, and mute mode while displaying the content.

According to various embodiments of the present disclosure, if one area is configured by moving the content and combining the divided blank areas, a blank area having a larger dimension can be secured, and a second program can be executed in the combined blank area. Here, an additional program to be executed may differ according to the movement direction of content. For example, if the content moves to the right side, a second program may be executed, and if the content moves to the left side, a third program different from the second program may be executed.

FIG. 6 illustrates screen examples of executing various functions in a blank area according to various embodiments of the present disclosure.

Referring to FIG. 1 and FIG. 6, reference number 610 illustrates an example of configuring a new blank area by combining the left and right blank areas, if the content is dragged rightwards. Reference number 610*a* indicates an area where the content is displayed and reference number 610*b* indicates a configured blank area. In an exemplary embodiment, a second application can be executed in the blank area 610*b*. The second application may be an instant messenger such as Kakao Talk and Chat-on, browser, message, or push notification service. For example, in the blank area 610*b*, a battery indication of electronic device 101 may be displayed as shown by reference number 610*c* and an instant message (for example, name of recipients such as 'Yoon-a') may be displayed as shown by reference number 610*d*. The battery remains and instant message may be displayed in an icon form as shown by reference number 610*e*.

Reference number 620 illustrates an example of configuring a new blank area by combining the left and right blank areas if the content is dragged leftwards. Reference number 620*a* indicates an area where the content is displayed and reference number 620*b* indicates a configured blank area. A third application can be executed in the blank area 620*b*. The third application may be applications such as a clock and a calendar. For example, content of a text message 'Mom, where are you?' shown by reference number 620*c* may be displayed in blank area 620*b*.

According to various embodiments of the present disclosure, when executing an instant messenger in the blank area, it is necessary to properly locate a message window and an input window in the blank area. For example, if the content moves to the left side, the processor can execute a mobile messenger in the blank area. A user initiate a chatting function with other users through the mobile messenger while also playing content. In addition, the user can synchronize the currently playing content so that the other users can watch the same scene currently playing on the users display. This will be described later referring to the accompanying drawings. If the content moves to the right side, time information or various notice message can be displayed in the blank area and a program such as a browser can be executed.

As described above, the method for moving the content can be performed by directly moving the content through a touch input, and the movement of content can be indirectly induced according to a grip position.

Figure 7:
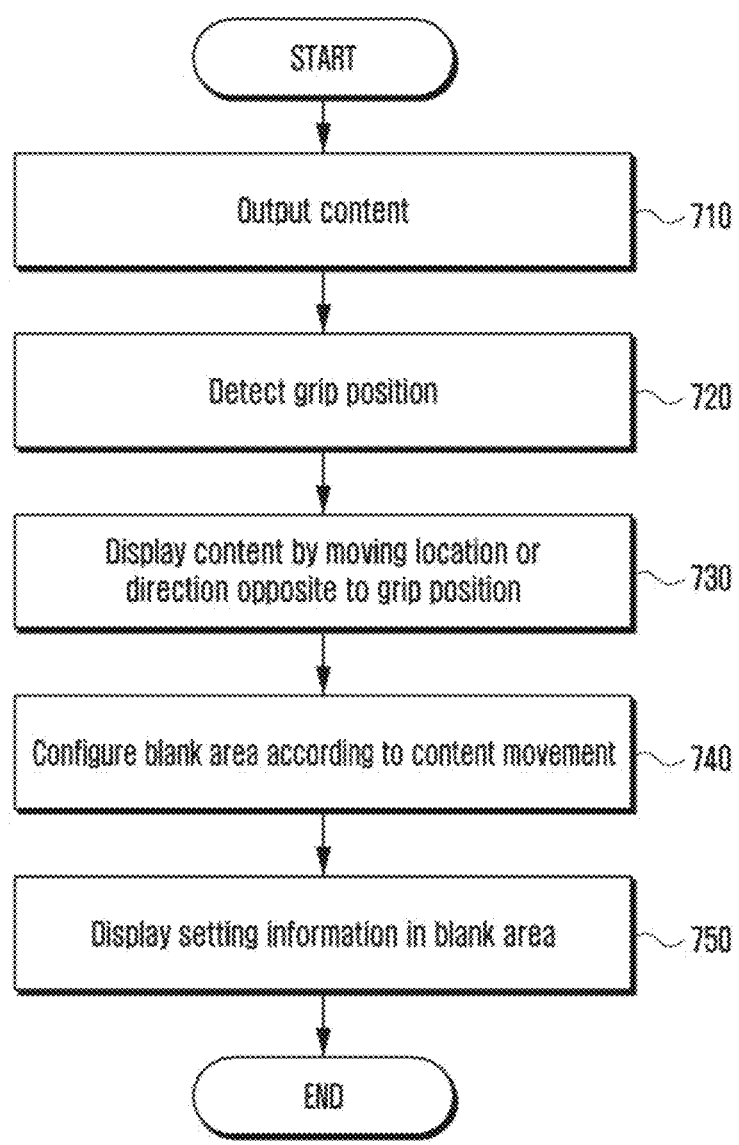
FIG. 7 is a flowchart illustrating a method for moving content corresponding to a grip position according to various embodiments of the present disclosure.

FIG. 7 is a flowchart illustrating a method for moving content corresponding to a grip position according to various embodiments of the present disclosure.

Referring to FIG. 1 and FIG. 7, the processor 120 outputs content at operation 710. A detailed description of operation 710 is omitted because operation 710 is identical to operation 410.

The processor 120 detects a grip position at operation 720. The processor 120 can detect the grip position through a finger touch, a proximity, or a hovering input using a sensor module 240 of electronic device 200 shown in FIG. 2, electronic pen, or part of user's body. For example, the sensor module 240 may include at least one of a gesture sensor 240A, a gyro sensor 240B, a barometric sensor 240C, a magnetic sensor 240D, a grip sensor 240F, a proximity sensor 240G, a color (RGB) sensor 240H, a biometric sensor 240I, a temperature/humidity sensor 240J, an illumination sensor 240K, or UV sensor 240M.

In an exemplary embodiment, because the right side of display 160 is covered by a palm or fingers if a user grips the right side of display 160, the processor 120 can detect a grip position on the right side of the display 160. Alternatively, if a signal is detected from the proximity sensor 240G installed at the right side of display 160, the processor 120 can identify that the user gripped the right side of display 160 and detect the covered right side as a grip position.

The processor 120 displays the content by moving to a location or in a direction opposite to the grip position at operation 730. Namely, the processor 120 can display the content by moving to an opposed location or in an opposed direction corresponding to the detected grip position. For example, if the grip position is the right side, the processor 120 can display the content by moving to the left side.

The processor 120 configures a blank area according to the movement of content at operation 740. The blank area is divided into two or more blank areas. In an exemplary embodiment, each blank area may be divided. The size of the blank area may be same as the sum of the blank areas divided into the upper and lower sides or right and left sides or different blank areas may have different sizes.

The processor 120 displays setting information in the blank area at operation 750. The setting information may include a function, an application, a program, an icon, and/or a symbol. The setting information may be set as a default in the electronic device 101 or may be configured by a user.

The processor 120 can change the display mode of the electronic device 101 according to the movement of content, similarly to the description of FIG. 4. For example, if the content is displayed in the center of display 160, the processor 120 can set a 'normal mode'. If the content is moved to the left side and a blank area is configured at the right side, the processor 120 can set a 'right mode'. If the content is moved to the right side and a blank area is configured at the left side, the processor 120 can set a 'left mode'. Further, the processor 120 can move the content to a displaced location by subdividing the displaced location. In an exemplary embodiment, the processor 120 may distinguish three locations such as a right, middle, and left, or five locations such as a right, half right, middle, half left, and left.

According to various embodiments of the present disclosure, a detecting range may cover the whole display 160 or a bezel part surrounding the display 160. Regarding to the time of setting a content play or output location, the content may be output after deciding a location by identifying a proximity or contact prior to the start of video or the content may be dynamically changed while playing the video.

Figure 8A:
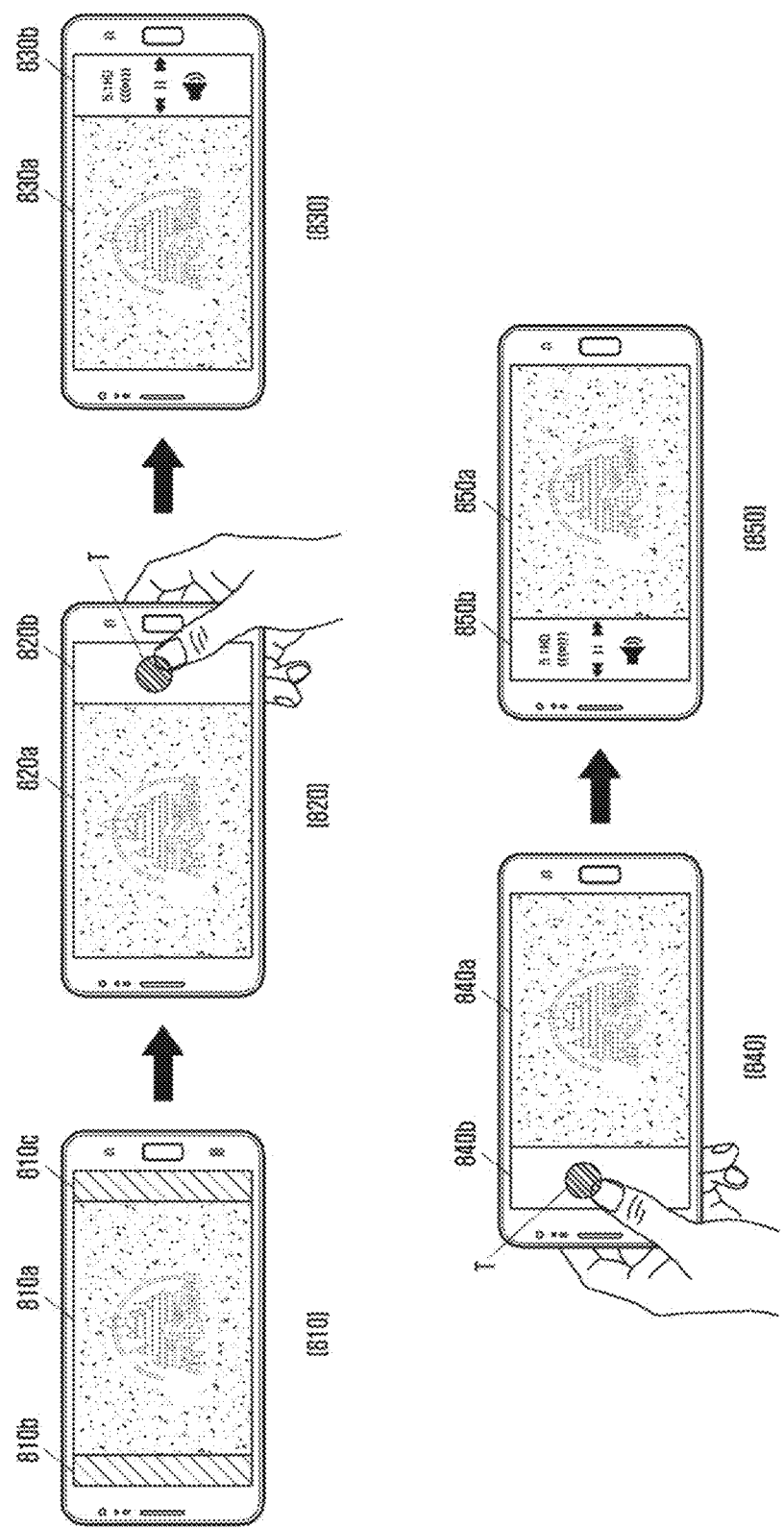

FIGS. 8A and 8B illustrate screen examples of moving content by detecting a grip position according to various embodiments of the present disclosure.

Referring to FIG. 8A, reference number 810 illustrates a normal mode outputting content in the center of display 160. In the normal mode, a play of content may be performed in a state associated with a predetermined configuration defined by a user. Reference number 810a indicates an area where the content is displayed, reference number 810b indicates a left blank area, and reference number 810c indicates a right blank area.

Reference number 820 illustrates a right mode moving the content to the left side opposite to the right side if an input associated with a grip is detected at the right side of display 160. The processor 120 can move the content to the left side opposite to reference number T where the display 160 is touched and a blank area is configured according to the movement of content. Referring to reference number 820, the blank area which initially existed at the left side disappears and a new blank area 820b is configured by combining the left blank area and the right blank area. Reference number 820a indicates an area where the content is displayed and reference number 820b indicates a configured blank area.

Reference number 830 illustrates an example of displaying content in an area associated with reference number 830a and displaying a function indicator related to the content in a blank area of reference number 830b in the right mode. The function indicator may be associated with a play, a temporary stop, a fast forward, a rewind, or a volume adjustment function if the content is a video.

Reference number 840 illustrates a left mode moving the content to the right side if a user grips the left side of display 160. The processor 120 can move the content to the right side opposite to reference number T where the display 160 is touched and configure a blank area 840b according to the movement of content. Reference number 840a indicates an area where the content is displayed and reference number 840b indicates a configured blank area.

Reference number 850 illustrates an example of displaying content in reference number 850a and displaying a function indicator related to the content in a blank area of reference number 850b in the left mode.

FIG. 8B illustrates an example of moving the content to a location or in a direction opposite to a touch location if the touch is generated using a stylus pen.

Referring to FIG. 8B, reference number 860 illustrates a normal mode where the content is displayed in the center of display 160. Reference number 860a indicates an area where the content is displayed, reference number 860b indicates a left blank area, and reference number 860c indicates a right blank area.

Reference number 870 illustrates a right mode moving the content to the left side if the right side of display 160 is touched or approached by an electronic pen. The processor 120 can move the content to the left side opposite to reference number T where the display 160 is touched and configure a blank area according to the movement of content. Reference number 870a indicates an area where the content is displayed and reference number 870b indicates a configured blank area.

Adversely, the same method can be applied when the left side of display is touched or approached by an electronic pen. When the right side of display 160 is covered by a specific object, a larger right blank area can be secured by moving the content to the left side and the same method can be applied when the left side of display 160 is covered.

Reference number 880 illustrates an example of automatically executing a function related an electronic pen when the display 160 is approached or touched by an electronic pen. Reference number 880a indicates an area where the content is displayed and reference number 880b indicates a configured blank area. The processor 120 can execute and display a notepad in blank area 880b regardless of the type of content output on the display 160.

According to various embodiments of the present disclosure, if no divided blank areas exist at the right and left side or at upper and lower sides because the size of content is identical to the size of display 160, the above embodiments can be applied by configuring a section having the least movement in the current content screen as a blank area.

According to various embodiments of the present disclosure, content can be automatically moved according to an analysis result of outputting content. For example, the content can be moved by estimating data amounts outputting in the right and left blank areas. The data amounts outputting in the right and left blank areas may differ based on a situation. The location of content can be configured according to an estimation and analysis result of data amounts associated with the content before outputting the content or while outputting the content on the display 160.

Figure 9:
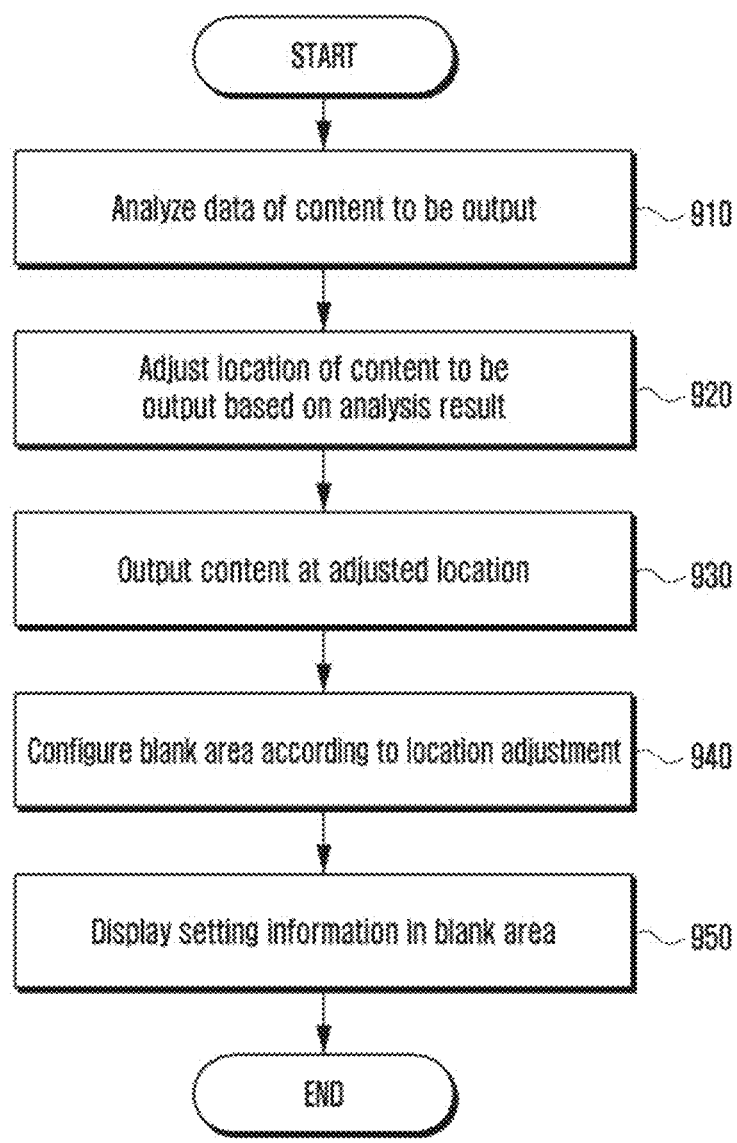
FIG. 9 is a flowchart illustrating a method for adjusting content by analyzing content data according to various embodiments of the present disclosure.

FIG. 9 is a flowchart illustrating a method for adjusting content by analyzing content data according to various embodiments of the present disclosure.

Referring to FIG. 1 and FIG. 9, the processor 120 analyzes content data to be output at operation 910. For example, if the content is a video, the content data may include not only the image but also a text such as a caption. The processor 120 can set the maximum size (height and width) of the blank area by scanning the caption.

The processor 120 adjusts an output location of content in a screen based on the analysis result at operation 920. For example, if the length of caption occupying a scene of specific content is great, the processor 120 may adjust the location of the corresponding content at the upper side.

The processor 120 outputs the content at the adjusted location at operation 930.

The processor 120 configures a blank area according to the adjustment of location at operation 940. After adjusting the location of content, the processor 120 can configure the blank area excluding an area of displaying the content. For example, if the content is located at the upper side, the blank area may be configured at the lower side.

Prior to the output of content, operations 910 to 940 may be fixed after scanning and analyzing the whole caption and the location of content can be adjusted dynamically and periodically while playing the content.

The processor 120 displays setting information in the blank area at operation 950. The setting information may include a function, an application, a program, an icon, and a symbol.

According to various embodiments of the present disclosure, the processor 120 can predetermine the size of the blank area based on a user setting or default setting information of the electronic device 101. Namely, the processor 120 can configure the blank area by identifying as much as the size required for displaying the setting information. For example, when a message application is to be executed in the blank area, the processor 120 can adjust the location of content so that the blank area can be secured for displaying the message by identifying size information of the maximum space. If the content is played or output after disposing the content by securing the blank area, a message can be displayed in the blank area without disturbing the content currently being played or output when a message is received while playing or outputting the corresponding content. Similarly, if a notepad is predetermined to be executed in the blank area, the processor 120 can adjust the location of content by identifying the maximum space information required for the notepad. Therefore, the processor 120 can prevent a disturbance of content play or output while a user prepares a memo in the notepad by using a pen.

Figure 10:
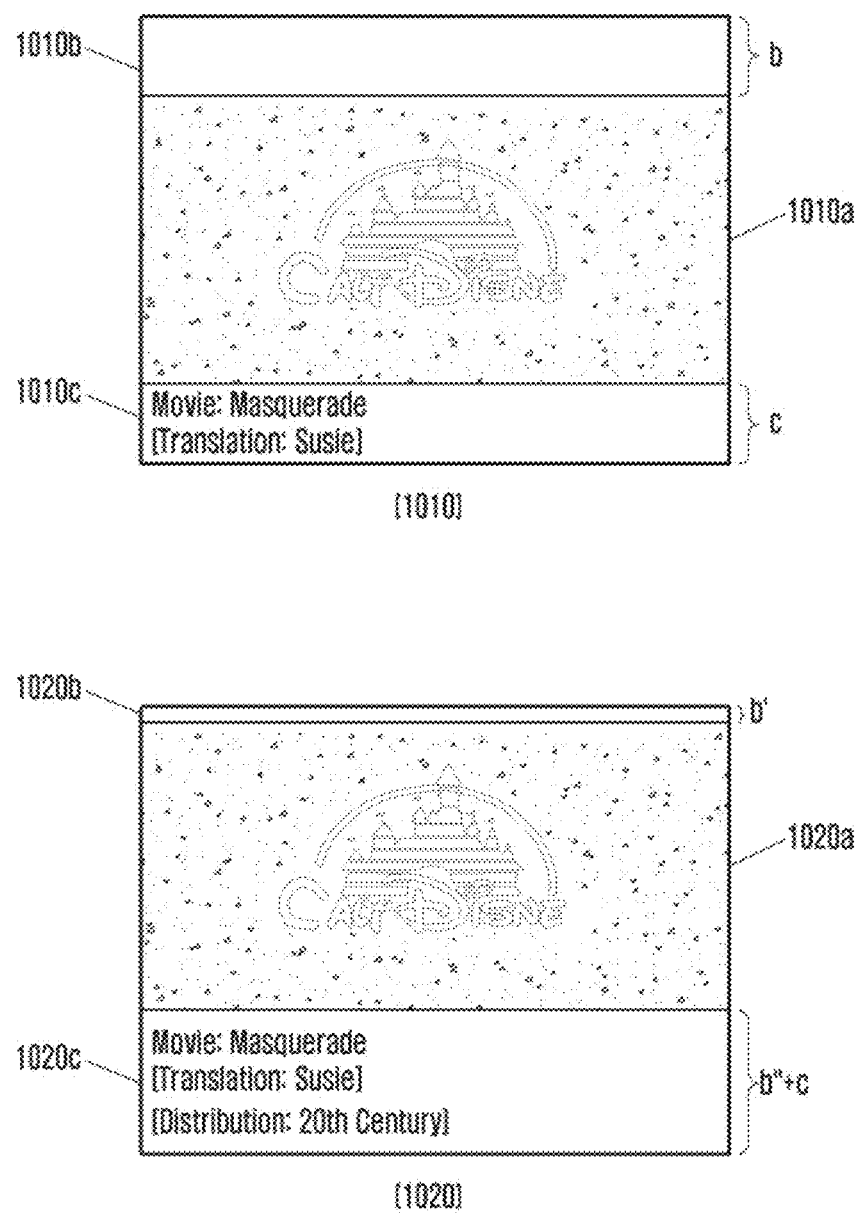
FIG. 10 illustrates screen examples of moving content corresponding to a data analysis result according to various embodiments of the present disclosure.

FIG. 10 illustrates screen examples of moving content corresponding to a data analysis result according to various embodiments of the present disclosure.

Referring to FIG. 1 and FIG. 10, reference number 1010 illustrates an example of displaying content in the center of display 160 and outputting a blank area at the upper and lower sides of the content. Reference number 1010a indicates an area where the content is displayed, reference number 1010b indicates an upper blank area, and reference number 1010c indicates a lower blank area. The width of upper blank area 1010b is 'b' and the width of lower blank area 1010c is 'c'. In an exemplary embodiment, if the content is a foreign movie, a caption is displayed in the lower blank area 1010c and the lower blank area 1010c is configured with the caption having two lines according to content data as shown by reference number 1010.

Reference number 1020 illustrates an example of displaying the content at a relatively upper area of the display 160 and outputting blank areas at the upper and lower areas of the content. Reference number 1020a indicates an area where the content is displayed, reference number 1020b indicates an upper blank area and reference number 1020c indicates a lower blank area. The processor 120 may configure the lower blank area 1020c to display three lines by analyzing a caption. Comparing reference numbers 1010 and 1020, the width of upper blank area 1020b is reduced to b', and the width of the blank area 1020c is increased to b"+c instead of by increasing as much as the reduction of upper blank area 1020b.

The processor 120 can adjust the location of content according to the analysis result and increase or decrease the blank area according to the adjustment of location. However, the location of content may be adjusted in the range of not influencing user's content viewing because too frequent adjustment of location may undesirably effect the user's content viewing.

According to various embodiments of the present disclosure, although a method of changing a display mode according to the movement of content has been described regardless of a blank area state, it is possible to process various events content according to the blank state if an input is received for moving a play screen upwards and downwards and/or rightwards and leftwards bottom. In the following example, the method of processing an event can differ according to the current state of the blank area. The state of the blank area may mean a state of displaying various notification in the blank area or a state of executing a second or third program. In this case, if a user moves a screen to rightwards and leftwards or upwards and downwards, not only can the mode change be performed by the above mentioned method but also operations related to the state of the blank area can be performed.

Figure 11:
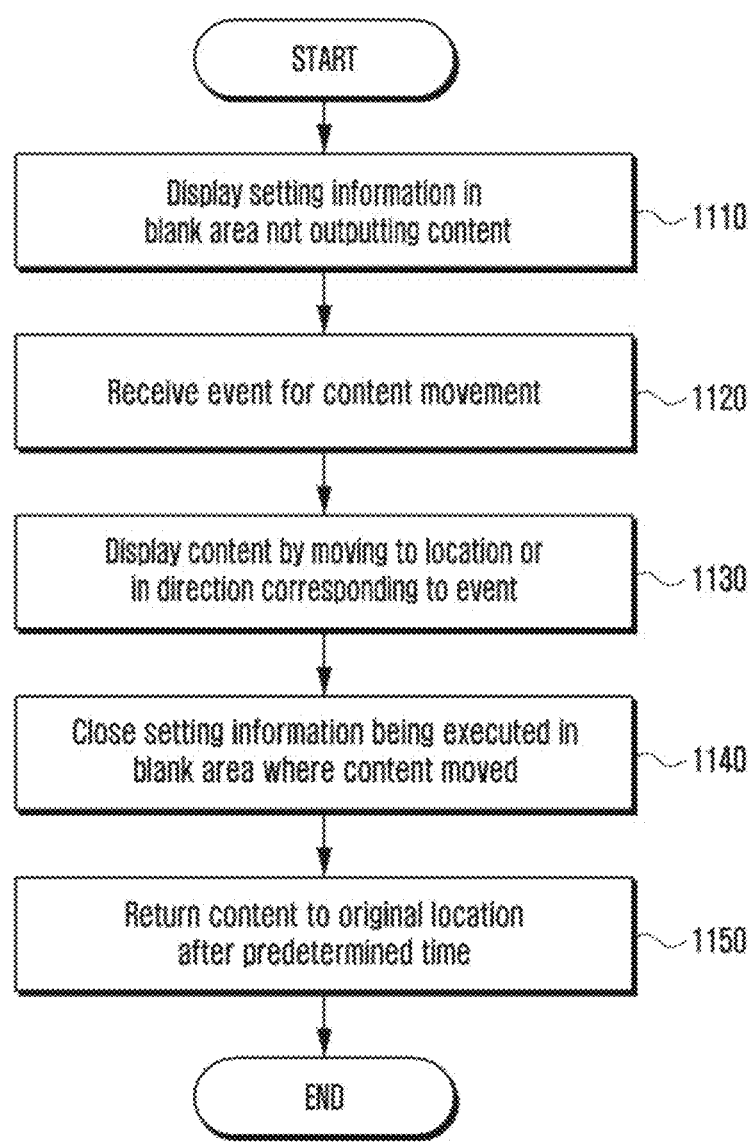
FIG. 11 is a flowchart illustrating a method for closing a function executing in a blank area corresponding to a content movement according to various embodiments of the present disclosure.

FIG. 11 is a flowchart illustrating a method for closing a function executing in a blank area corresponding to a content movement according to various embodiments of the present disclosure.

Referring to FIG. 1 and FIG. 11, the processor 120 displays setting information in a blank area where the content is not displayed at operation 1110. The setting information may include a function, an application, a program, an icon, and/or a symbol. The setting information can be set as a default in the electronic device 101 or configured by a user. For example, the content may be displayed in the center of display 160 and the setting information may be displayed in blank areas located at the right and left sides of the content. Alternatively, the setting information may be displayed in the blank areas located at the upper and lower sides of the content.

The processor 120 receives an event for moving the content at operation 1120. The event may mean a touch, a gesture, a proximity input, or a hovering input using an electronic pen or a part of user's body. For example, the event may be generated by moving the content to at least one of up, down, right, and left directions, and releasing after touching the display 160 while the content is being displayed in the display 160. In an exemplary embodiment, the operation of touching, moving, and releasing may be interpreted as a drag and drop operation.

The processor 120 moves the content to a location or in a direction according to the event at operation 1130. For example, the processor 120 can move the content to the right, left, upper, or lower side of the display 160 according to the direction of event. The processor 120 can subdivide the movement location of content according to the screen size of display 160. For example, the processor 120 can distinguish five locations such as a right, half right, middle, half left, and left.

The processor 120 can close setting information being displayed in the blank area configured by moving the content at operation 1140. The displayed setting information may include one or more items. For example, if the content is moved to the right side while a message is displayed in the blank area by executing a schedule application, the processor 120 closes the message and schedule application.

Referring to FIG. 11, if the setting information displayed in the blank area includes more than one item while outputting the content, each item is not closed one by one but a plurality of items may be closed at simultaneously by moving the content to the blank area. User conveniences can be improved by closing the plurality of setting information with one operation of moving the content.

The processor 120 returns the content to an original location after a predetermined time at operation 1150. The predetermined time may be defined by a user or may be set as a default in the electronic device 101. User conveniences can be improved by returning the content to the original location after the predetermined time expires and after closing the displayed setting information simultaneously by moving content.

FIG. 12 illustrates screen example of closing a function executing in a blank area corresponding to content movement according to various embodiments of the present disclosure.

Referring to FIG. 12, reference number 1210 illustrates an example of displaying the content in the center of display 160 and outputting blank area at the right and left sides of the content. Reference number 1210a indicates an area where the content is displayed, reference number 1210b indicates a left blank area, and reference number 1210c indicates a right blank area. A message, messenger, or alarm application may be executed in the left blank area 1210b. In an exemplary embodiment, as illustrated in 1210, a notification message, such as a spam message or advertisement, may be executed in the right blank area 1210c and function indicators may be displayed in the left blank area 1210b.

Reference number 1220 illustrates an example of moving the content to the right side. When an input is detected associated with the content being moved to the right side, the processor 120 can simultaneously delete notification messages executing in the right blank area 1210c illustrated in 1210.

Reference number 1230 illustrates an example where the right blank area 1230a returns to the display 160 and the notification messages executed in the right blank area 1230a have been deleted when the content is moved to the left side in the state of showing reference number 1220. Comparing reference numbers 1210 and 1230, the notification messages previously executed in the right blank area are no longer displayed in the display 160 after closing are reopening the right blank area 1230a. If the content is moved to the left side as shown by reference number 1230, the processor 120 can simultaneously close the applications being executed in the left blank area 1210b. In an exemplary embodiment, each notification message can be deleted by selecting each one individually. However, sometimes it may be more convenient to delete all the messages simultaneously.

Referring to FIG. 12, content is displayed having an image ratio 21:9 in a display 160 having a screen ratio 16:9 is described. If the content having an image ratio 21:9 is played in the display 160 having a screen ratio 16:9, blank areas are not displayed in the right and left sides but displayed in the upper and lower sides. In this case, a similar effect can be generated by moving the content according to events as described above.

According to various embodiments of the present disclosure, the processor 120 may set an area for displaying a message by analyzing the message. In an exemplary embodiment, the processor 120 can display a major message in the right blank area and a suspicious spam message in the left blank area. For example, if a user wants to delete the spam message, the spam messages can be deleted simultaneously by moving the content to the left side and messages displayed in the right blank area may be maintained. Further, the processor 120 can delete the displayed notification message or executing program in the blank area by moving fast to the upper, lower, right, or right side or by returning blank areas to an initial location by diversifying the kinds of events. For example, if a finger is maintained to touch the display 160 after moving the content, the processor 120 may show a notification message hidden in the blank area or browser content hidden in the screen.

According to various embodiments of the present disclosure, a content marking can be utilized as a method for using a blank area. The content marking means displaying information directly or indirectly related to the content currently being output. The related information may include various information such as an output location of the current content, time information, actor/actress information associated with the content, product information related to the content, and an advertisement. Further, the meaning of displaying information may include not only the visual output in the display 160 but also outputs of sound and vibration. Hereafter, a method for sharing a play section and marking the output content with another person and a method for synchronizing a second program by using the marking will be described. Further, various types of marking listed in the blank area will be described.

Figure 13:
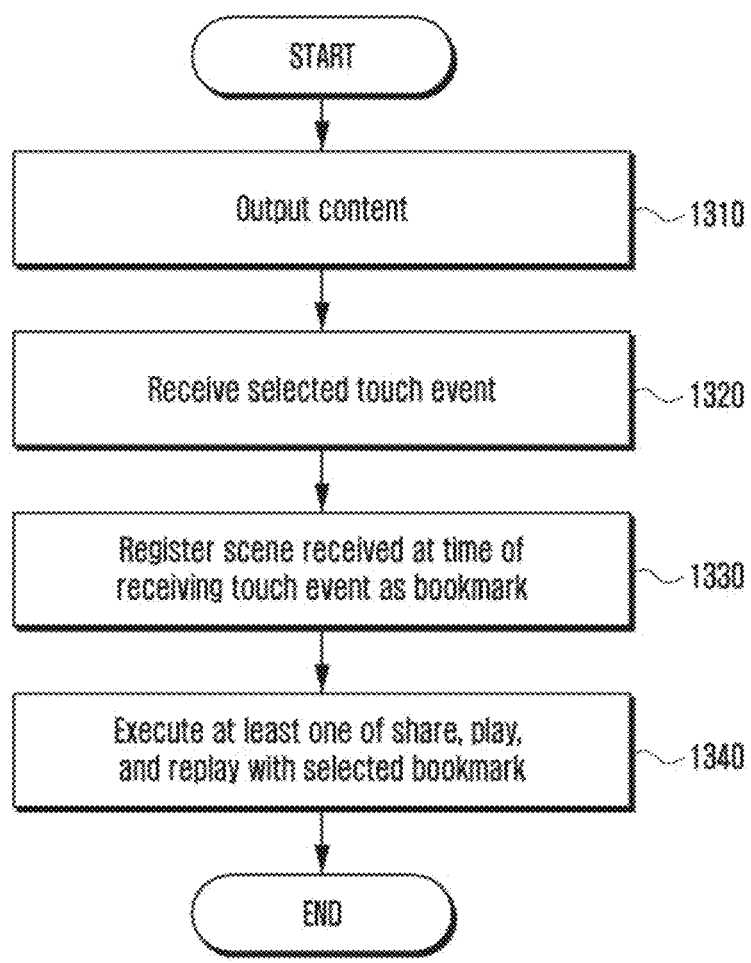
FIG. 13 is a flowchart illustrating a method for using a content scene as a bookmark corresponding to a touch event according to various embodiments of the present disclosure.

FIG. 13 is a flowchart illustrating a method for using a content scene as a bookmark corresponding to a touch event according to various embodiments of the present disclosure.

Referring to FIG. 1 and FIG. 13, the processor 120 outputs content at operation 1310. The content may be at least one of a text, an image, an audio, a video, an icon, and/or a symbol. In an exemplary embodiment, the processor 120 can display the content in the center of display 160 and evenly display blank areas at the right, left, right, and/or left side.

The processor 120 receives a selected touch event at operation 1320. In an exemplary embodiment, the selected touch event may include a drag and drop touch or a long touch. For example, the drag and drop touch is a method that a user touches a screen and moves a selected content scene to a blank area without releasing a hand. The long touch is a method that a user touches a screen and maintaining for a predetermined time.

The processor 120 registers a scene displayed at the time of receiving the touch event in the blank area as a bookmark at operation 1330. This means that a user marks a desired scene from the content currently being output and the marked scene is listed up as a bookmark in the blank area. The bookmark to be registered may include a whole image of the content play screen, a partial image of the content play screen (for example, a face area of actor/actress, a building, an object, a company name, a brand logo, a text, a landmark, an accessory, shoes, and clothing), a partial image of the content, a caption associated with the content, content OST, and a play location and a section of content. A bookmark list including at least one bookmark can be displayed in the blank area. When registering a bookmark, a method of storing an image by capturing a screen as well as a method of generating a partial image in a video clip form can be provided.

For example, in the case of drag and drop touch input, if a user touches a desired content scene in the display 160 and drags to the blank area, the processor 120 can add the dragged content scene to the bookmark list, and store (register) the dragged content scene after a predetermined time. Alternatively, if the user touches the screen of display 160 or a starting image stored in the bookmark list, a video clip is generated and stored. In the case of long touch, the processor 120 can register a bookmark by storing an image from the beginning of touching the display 160 to the end of touching as a video clip. Namely, the processor 120 can store a content scene in a buffer at the beginning of touching and register the content scene stored in the buffer in the bookmark list of the blank area if the touch state is maintained for a predetermined time.

The processor 120 performs at least one of a share, play, and replay for the selected bookmark at operation 1340. The user can select one bookmark from the bookmark list registered in the blank area. If a bookmark is selected, the processor 120 can perform a share, play, or replay of the selected bookmark. For example, if the user selects a bookmark of corresponding content to replay the identical content, the processor 120 can start to play from a scene of the selected bookmark. Further, when selecting a content bookmark, the corresponding scene can be repeatedly played by designating a specific time before and after selecting the scene. Such a function may be useful for a person learning a foreign language. Further, the function of content marking for a specific scene can be shared with another person through SNS. A method of sharing a scene can be performed by transmitting metadata such as a play time to another person's electronic device. Alternatively, if the counterpart device can play the same file using a function of cloud computing, a content scene can be played from the time of registering a bookmark using the shared file information and bookmark metadata to search an identical file.

Figure 14A:
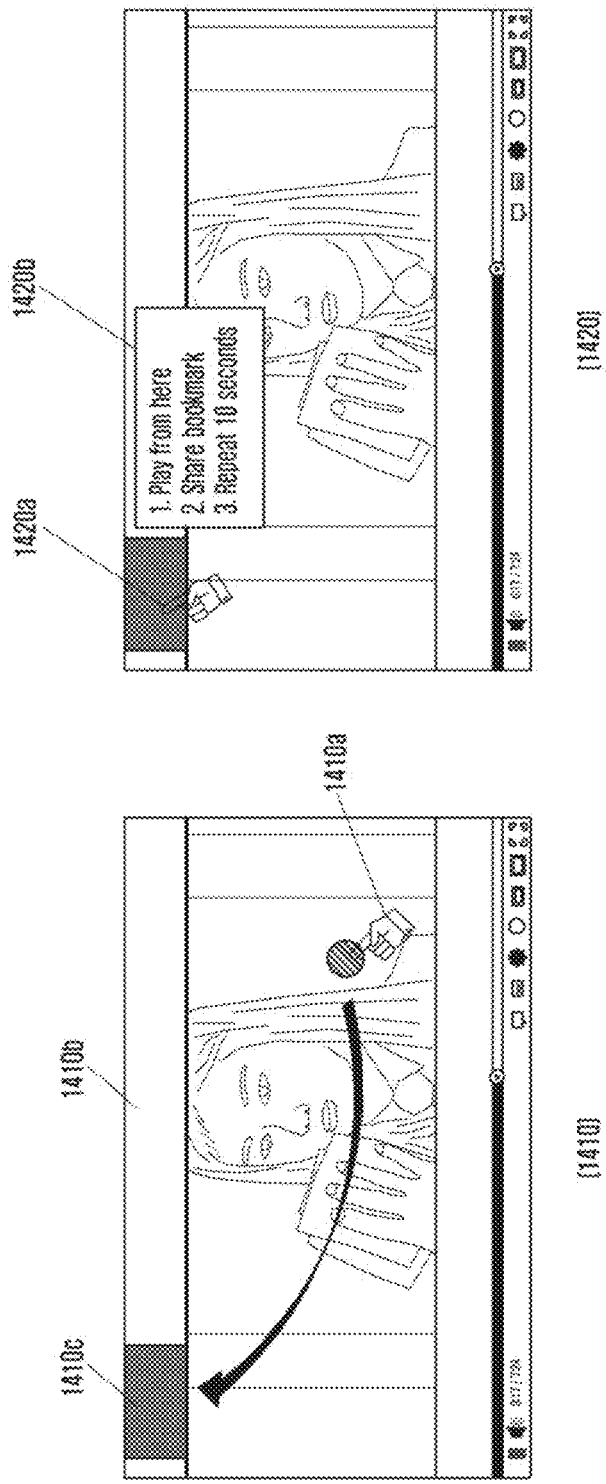
FIGS. 14A, 14B, and 14C illustrate screen examples of using a content scene as a bookmark corresponding to a touch event according to various embodiments of the present disclosure.
Figure 14B:
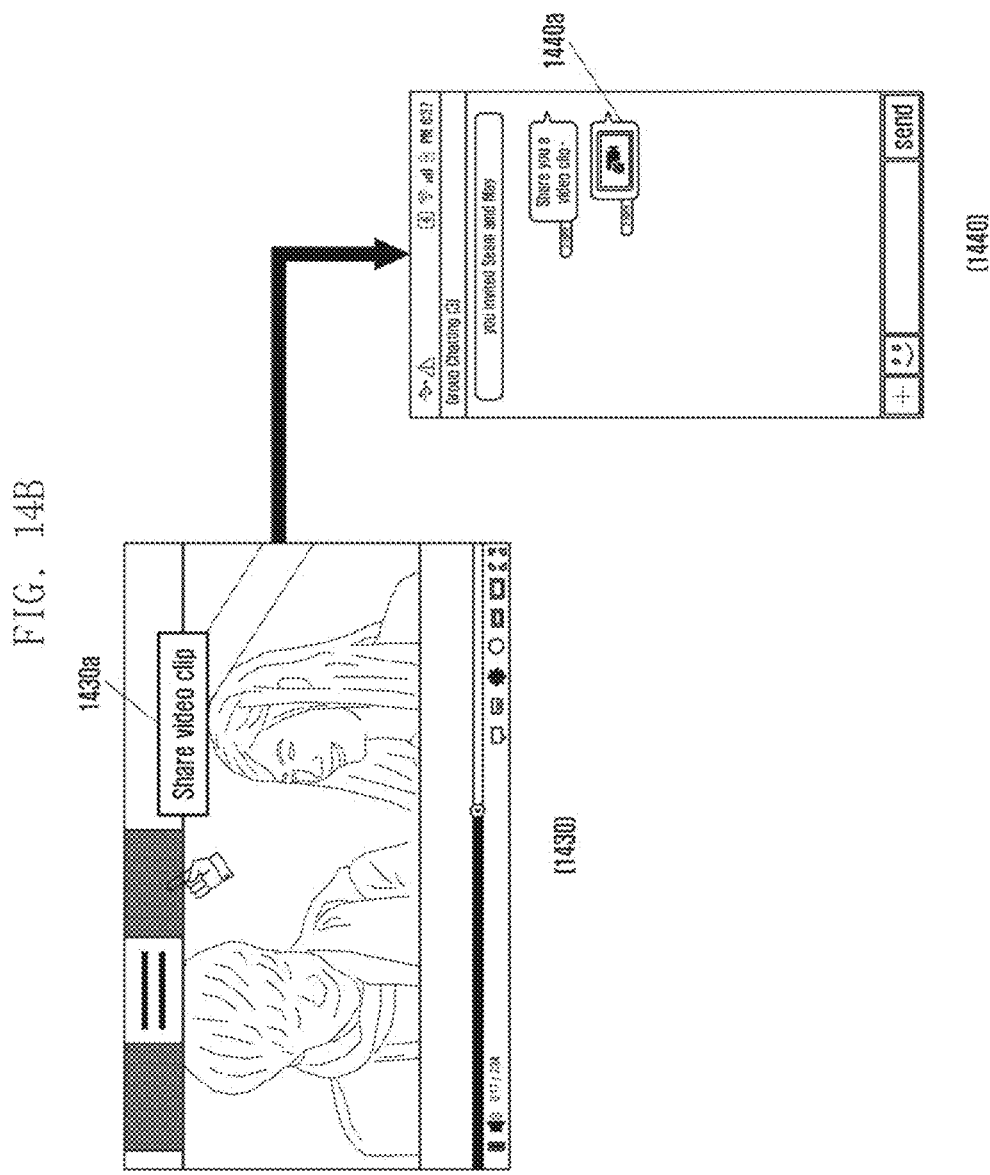
Figure 14C:
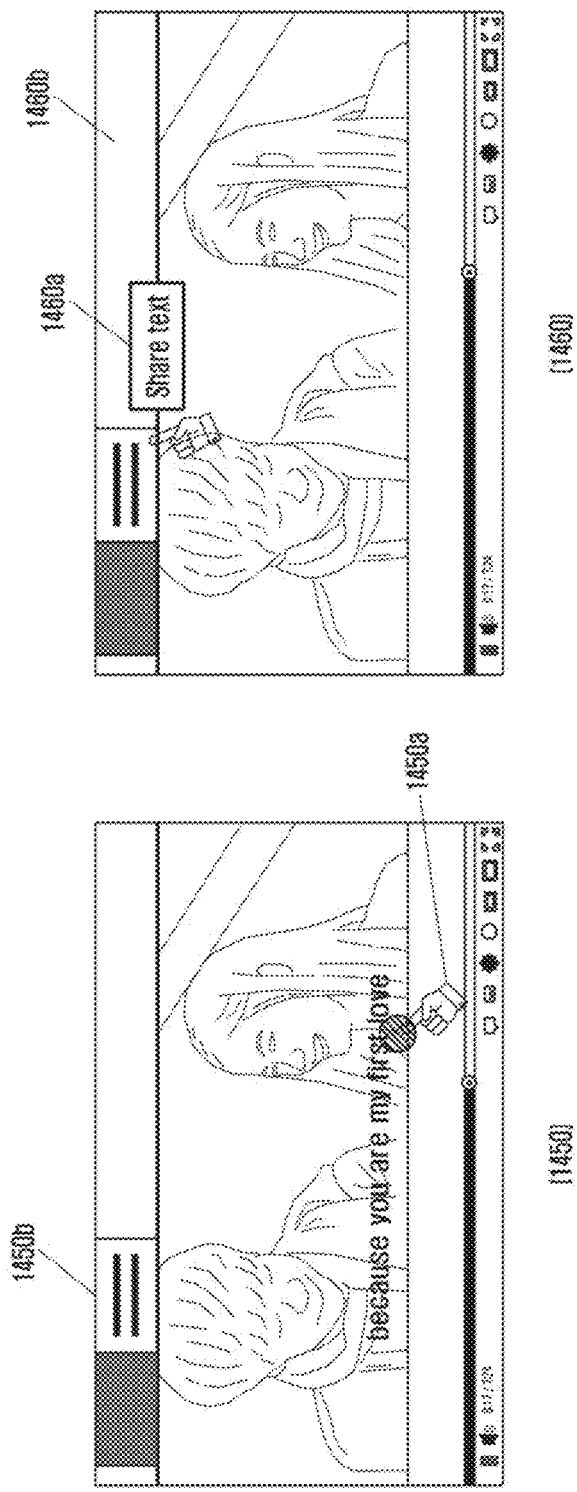

FIGS. 14A to 14C illustrate screen examples of using a content scene as a bookmark corresponding to a touch event according to various embodiments of the present disclosure.

Referring to FIG. 14A, reference number 1410 illustrates a screen for registering a content scene as a bookmark according to a touch event. For example, a user can input a 'long touch' shown by reference number 1410*a* in a content being played. The processor 120 can identify the content scene displayed at the time the touch input is initiated as a bookmark. Reference number 1410*c* shows a content scene identified as a bookmark. The processor 120 can register a bookmarked content scene 1410*c* in the blank area of reference number 1410*b*.

Reference number 1420 illustrates a screen executing a bookmark registered in the blank area. If the user selects a bookmark registered in the blank area as shown by reference number 1420*a*, the processor 120 can display a bookmark function as shown by reference number 1420*b*. The bookmark function may include a play, share, and replay function. If the play function (e.g., "Play from here") is selected, the processor 120 can play a content scene associated with the bookmark. If the share function (e.g., "Share bookmark") is selected, the processor 120 can share the content scene registered as a bookmark with another person through SNS. If the replay function (e.g., "Repeat 10 seconds) is selected, the processor 120 can repeat the content scene registered as a bookmark.

Referring to FIG. 14B, reference number 1430 illustrates a screen displayed when 'share' is selected in FIG. 14A. If the share function is selected, the processor 120 can display an indication that the content scene is selected from the bookmarks functions as shown by reference number 1430*a* (e.g., "Share video clip"). If the share function is selected, the processor 120 can execute an application (for example, message, chatting, and twitter) to share a content scene selected from the bookmark with another person. When the share function is selected at the electronic device 101 by a user, an application to execute the sharing can be dynamically configured or set as a default in the electronic device 101. In an exemplary embodiment, reference number 1440 illustrates a screen executing a chatting application. Reference number 1440*a* illustrates an indication that the content scene to be shared to another person has been transmitted. If the identical content cannot be played in another person's electronic device, a video clip for a predetermined time may be generated from the selected content scene in order to transmit to another person. If the capacity of video clip is too great, the processor 120 can transmit the video clip by resizing or transmit to a corresponding URL by searching a similar video clip through the Internet.

According to various embodiments of the present disclosure, the sharing of a content bookmark may be performed not only for the content scene but also for background music or a caption. In an exemplary embodiment, the processor 120 can share the background music of content as a bookmark or provide a function of sharing an impressive dialogue or caption as a bookmark. For example, if the user selects a desired dialogue from a video being played, the processor 120 may utilize a method of listing the selected dialogue in the blank area as a bookmark and sharing with another person by selecting a dialogue of content to be shared from the bookmark list. The user can easily share bookmarks listed in the blank area with another person without disturbing the viewing of content.

Referring to FIG. 14C, reference number 1450 illustrates a screen for registering a content caption as a bookmark. The user can perform a long touch on a caption 'because you are my first love' of content as shown by reference number 1450*a*. If the long touch is input in the caption, the processor 120 can register the caption as a bookmark in a blank area as shown by reference number 1450*b*. Reference number 1460 illustrates a screen for sharing a caption selected from the bookmark with another person. Reference number 1460*b* indicates the blank area. A bookmark list can be displayed in the blank area 1460*b*. If the user select a bookmark and selects 'share' from the selected bookmark, the processor 120 can display a content caption to be shared as shown by reference number 1460*a* (e.g., "Share text").

According to various embodiments of the present disclosure, if a new image is added, the processor 120 can provide a function of displaying image information added to the blank area.

Figure 15:
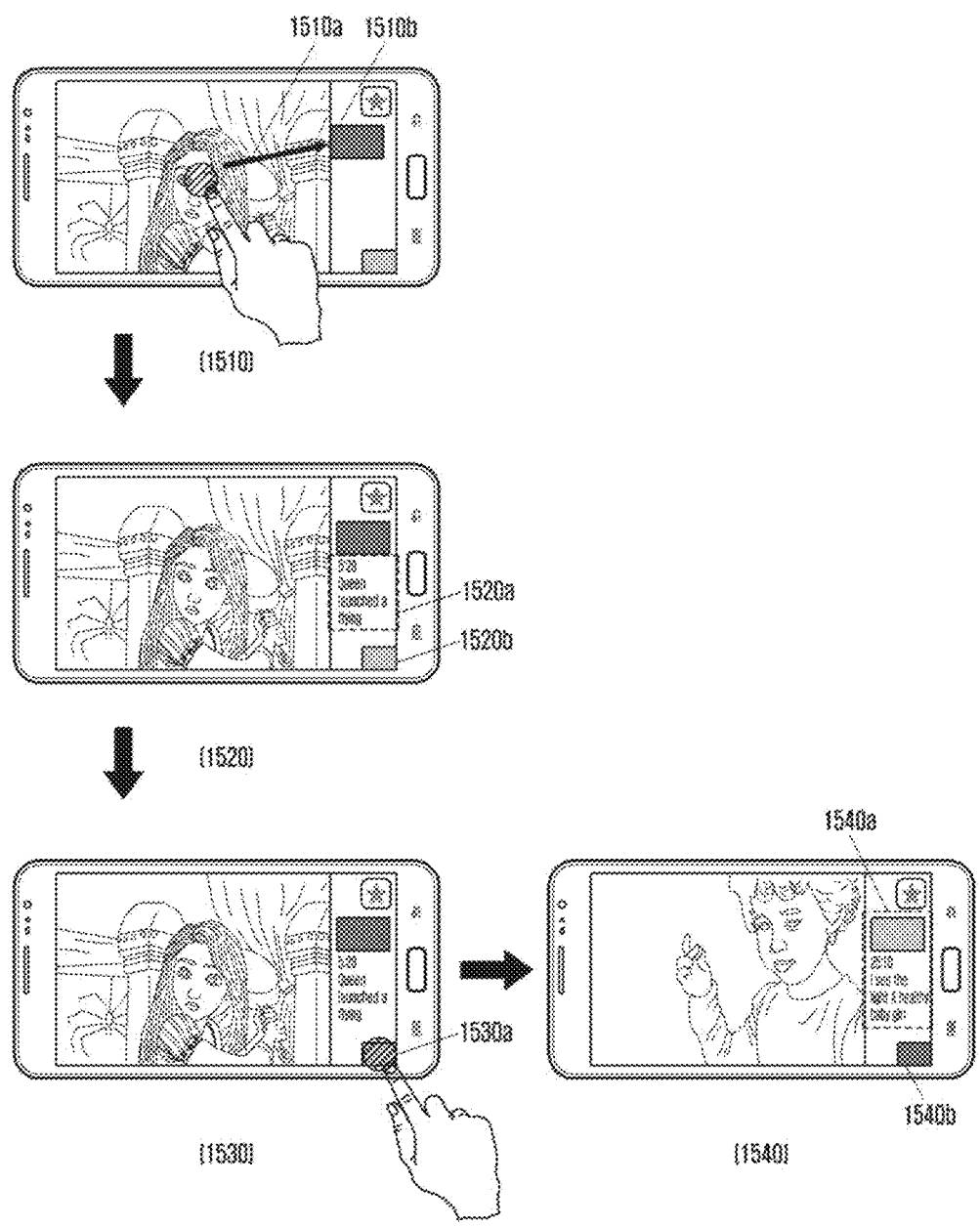
FIG. 15 illustrates screen examples of outputting content by using a bookmark according to various embodiments of the present disclosure.

FIG. 15 illustrates screen examples of outputting content by using a bookmark according to various embodiments of the present disclosure.

Referring to FIG. 15, reference number 1510 illustrates an example of registering a bookmark in a drag and drop method in a state of moving content to the left side and configuring a blank area at the right side. A user may touch the display 160 at the time of registering a bookmark, drag as shown by reference number 1540*a*, and drop in the blank area. If the drag and drop touch is completed, the processor 120 can register a content scene at the time of touching as a bookmark as shown by reference number 1510*b*.

Reference number 1520 illustrates an example of displaying content and related information in the blank area. Reference number 1520*a* illustrates an example of displaying a content scene registered as a bookmark and related information or content currently being played and the related information. For example, in reference number 1520*a*, the content scene registered as a bookmark has a play time of 5 min 20 sec and a description of content scene (for example, "Queen launched a flying") may be displayed. Alternatively, reference number 1520*a* can provide not only the information obtained from an image such as a play time of image selected by the user, a caption, an OST, and a place, but also a web site related to the image or information provided by a remote terminal. If the user selects an image or related information added to the bookmark list, the processor 120 can transmit the selected image or information to SNS or other devices. Further, other content scenes registered as a bookmark may be displayed in the blank area as shown by reference number 1520*b*.

Reference number 1530 illustrates an example of selecting a content scene registered in the bookmark list by a user. The user can select a content scene from the bookmark list as shown by reference number 1530*a*. Reference number 1540 illustrates an example of playing the selected content scene. The processor 120 can start to play the content scene from the time of selecting the content scene. Information related to the content scene currently being played may be displayed in the blank area as shown by reference number 1540b. Reference number 1450a corresponds to the content scene having a play time 25 min 10 sec, and a description of content scene (for example, "I see the light a healthy baby girl") may be displayed. Further, a content scene played before the selection of content may be displayed in the blank area as shown by reference number 1540b.

Figure 16:
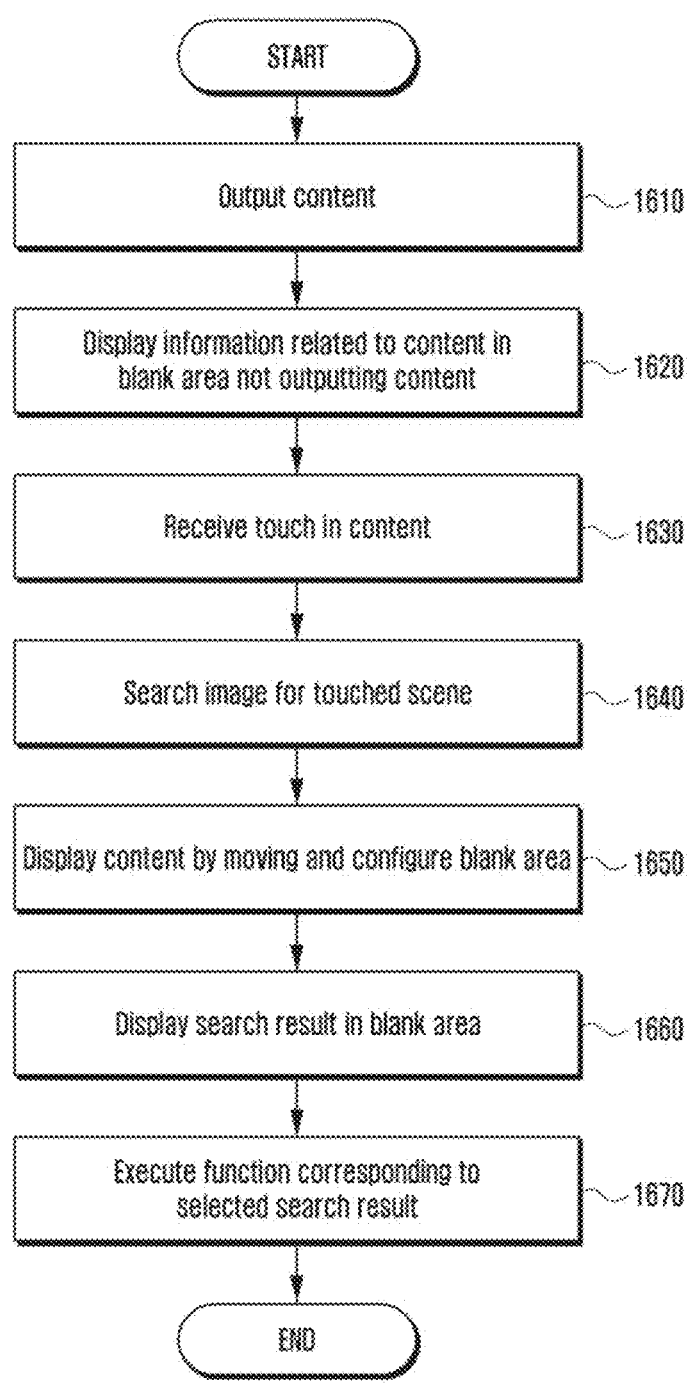
FIG. 16 is a flowchart illustrating a method for displaying information related to content in a blank area according to various embodiments of the present disclosure.

FIG. 16 is a flowchart illustrating a method for displaying information related to content in a blank area according to various embodiments of the present disclosure.

Referring to FIG. 1 and FIG. 16, the processor 120 outputs content at operation 1610. The content may be at least one of a text, an image, an audio, a video, an icon, and/or a symbol. The processor 120 can display the content in the center of screen of the display 160 and evenly display blank areas at the right and left sides, or at the upper and lower sides.

The processor 120 displays information related to the content in the blank area where the content is not displayed at operation 1620. The information may include Wikipedia information, a place, a person (for example, actor/actress), SNS, a related image (for example, image having a similar genre with the displayed content), a sharable application, a director, a brand, a price, a purchasable site or place, a map displaying a related area, and/or a related advertisement. The time of outputting the information may be diversified and generally a method of sequentially showing information related to the currently playing a content scene may be used. Various information can be sequentially provided by synchronizing with the currently outputting scene regardless of user's intention. Alternatively, information can be provided corresponding an event input by the user. For example, if a specific actor/actress is selected while playing content, information related to the actor/actress can be output in the blank area.

The processor 120 receives a touch input in the content at operation 1630. The touch input may be received for obtaining other information besides the information displayed at operation 1620. For example, the touch input may be received to obtain background music information associated with the content scene, information related to a place, information related to clothing, shoes, and an accessory worn by a character, or a URL address providing the information.

The processor 120 searches an image related to the touched scene at operation 1640. The processor 120 may search using information pre-stored in the electronic device 101 or in a web server. For example, if the touched content scene displays the Kremlin and the user select the Kremlin, the processor 120 can search an image of the Kremlin.

In an exemplary embodiment, the image search function may be provided in the blank area formed according to the screen ratio of playing video. The user may desire to search a text or information associated with a person, an object, and/or a place shown in the playing video. Conventionally, the prior art can only perform such searches after finishing the play of the video or the play of video has to be temporarily stopped and text has to be input by executing a search application like a web browser. Therefore, various embodiments of the present disclosure enable the image search with a simple touch operation without disturbing the play of video by using the blank area formed during the play of video.

The processor 120 displays by moving the content and configures a blank area according to the movement of content at operation 1650. The processor 120 can move the content in order to display the search result prepared at operation 1640. In an exemplary embodiment, it may not be easy to display the entire search result because the blank areas are separately displayed at both sides at operation 1640. In this case, the processor 120 can combine the divided blank areas into one to display the search result. The combined blank area may have the same dimension as the sum of the blank areas divided into the upper and lower sides or the right or left sides, or the blank areas may have different dimensions.

The processor 120 displays the search result in the blank area at operation 1660. For example, the search result may include a Wikipedia capture screen, tourist information related to the Kremlin, and movie information related to the Kremlin.

The processor 120 performs a function corresponding to a selected search result at operation 1670. The user can select at least one from the search result displayed at operation 1660. For example, if the user selects the Wikipedia capture screen, the processor 120 can connect to Wikipedia by executing a web browser.

Figure 17A:
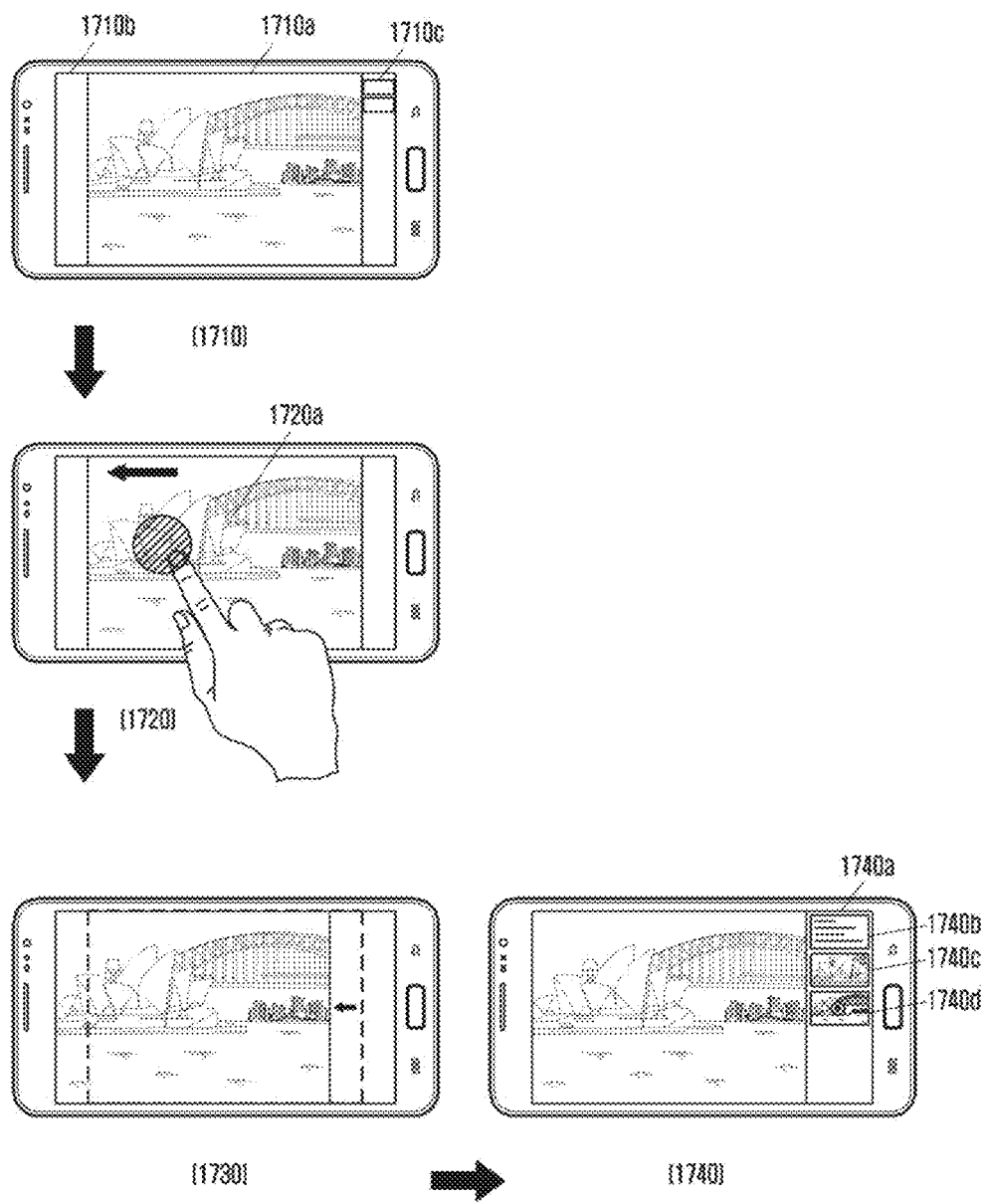
FIGS. 17A and 17B illustrate screen examples of displaying information related content in a blank area according to various embodiments of the present disclosure.
Figure 17B:
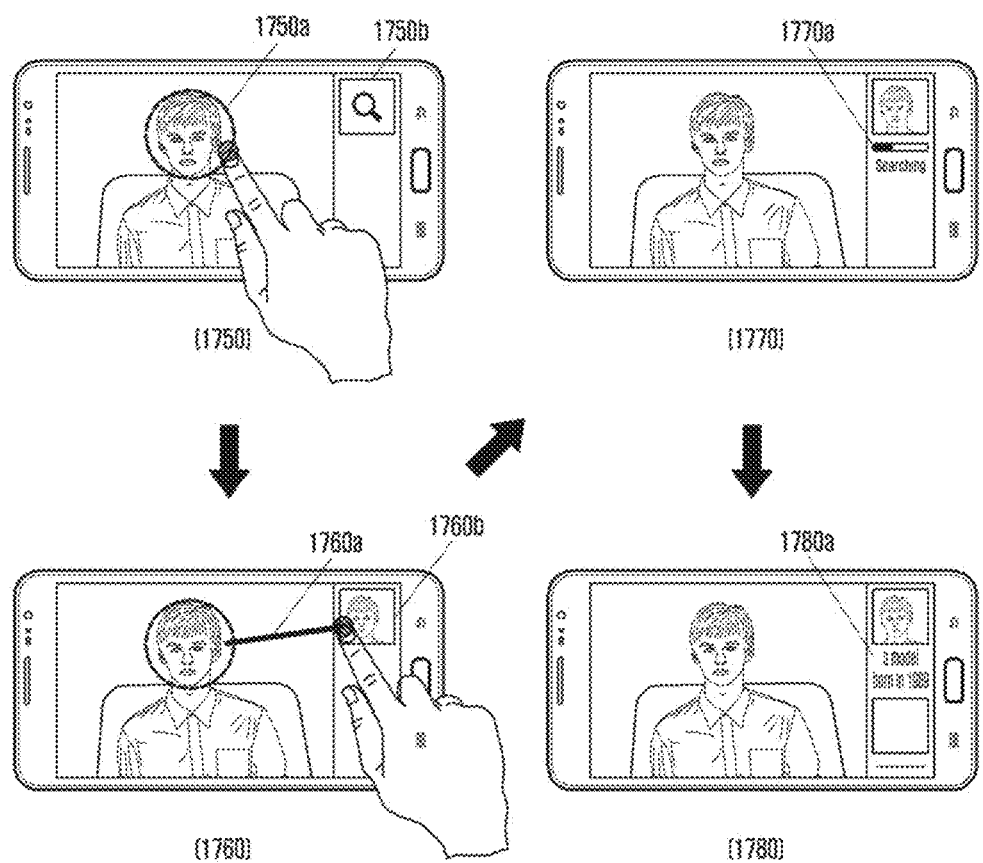

FIGS. 17A and 17B illustrate screen examples of displaying information related content in a blank area according to various embodiments of the present disclosure.

Referring to FIG. 17A, reference number 1710 illustrates a content scene of a video which displays the Opera House in Australia. Reference number 1710a indicates an area where the content scene is displayed in the center of display 160. Reference number 1710b and reference number 1710c indicates blank areas displayed at both sides of the content scene. Here, information related to the content scene can be displayed in reference number 1710c. For example, the information may be related to a leading actor/actress, a director of the video, and a similar genre.

Reference number 1720 illustrates an example of receiving a touch input in the content as shown by reference number 1720a. In order to search an image of Opera House, the user may select an image to be searched in the playing content without stopping the play of content. Reference number 1730 illustrates an example of moving the content to the left side according to the reception of touch input. Namely, the processor 120 can move the content to the left side to display the result of image search according to the reception of touch input. The processor 120 then can configure a blank area according to the movement of content.

Reference number 1740 illustrates an example of displaying the result of image search in the configured blank area. Reference number 1740a indicates a blank area, and reference numbers 1740b to 1740d indicate the result of image search. For example, reference number 1740b indicates a location and tourist information of Opera House, reference number 1740c indicates a Wikipedia capture screen associated with the Opera House, and reference number 1740d indicates restaurant information nearby Opera House. If the user selects one of the options associated with the reference numbers 1740b to 1740d, the processor 120 can execute a function for providing the selected information. For example, if the user selects the Wikipedia capture screen, the processor 120 can execute an image viewer.

Referring to FIG. 17B, reference number 1750 illustrates a screen for selecting a person in a movie being played by the user. Reference number 1750a indicates an object touched by the user in the movie. Reference number 1750b indicates a sign of providing an image search function in the blank area. For example, the user can select an area of person to be searched and the processor 120 can generate and display a guideline in the selected area. In reference number 1750, the guideline may be a circle surrounding a face of person. The user can adjust the size of guideline and set a search area through the guideline.

Reference number 1760 illustrates an example of touching the internal area of guideline and dragging to the blank area. Reference number 1760a indicates the touching and dragging the internal area of guideline to the blank area. The processor 120 can move the image in the internal area of guideline to the blank area as shown by reference number 1760b.

Reference number 1770 illustrates a screen of performing an image search for a person included in the guideline. Reference number 1770a indicates an image of person and a progress bar of searching (for example, "Searching"). Reference number 1780 illustrates a screen for displaying the search result after completion of image search for the person. Reference number 1780a illustrates an example of displaying 'a model born in 1989' and another image as the search result. Further, the search result may include a SNS address and provides an automatic function of applying for a friend, registering a friend, and becoming a follower only with a user's simple touch input.

In an exemplary embodiment, a sensor for extracting biometric information of a user is launched in various smart equipment. In particular, an emotion state can be identified using the biometric information of the user. By using this method, while the user is viewing a video, emotion states of video scenes such as joy, sadness, and impression can be listed up in the blank area by automatically capturing a scene. The captured scene can be shared with another person by generating a bookmark. Further, information referred to a user's emotion state can be output through the blank area. The extraction of a user's biometric signal can be measured and received not only from a device currently playing a video but also from a second wearable device such as a smart watch.

Figure 18:
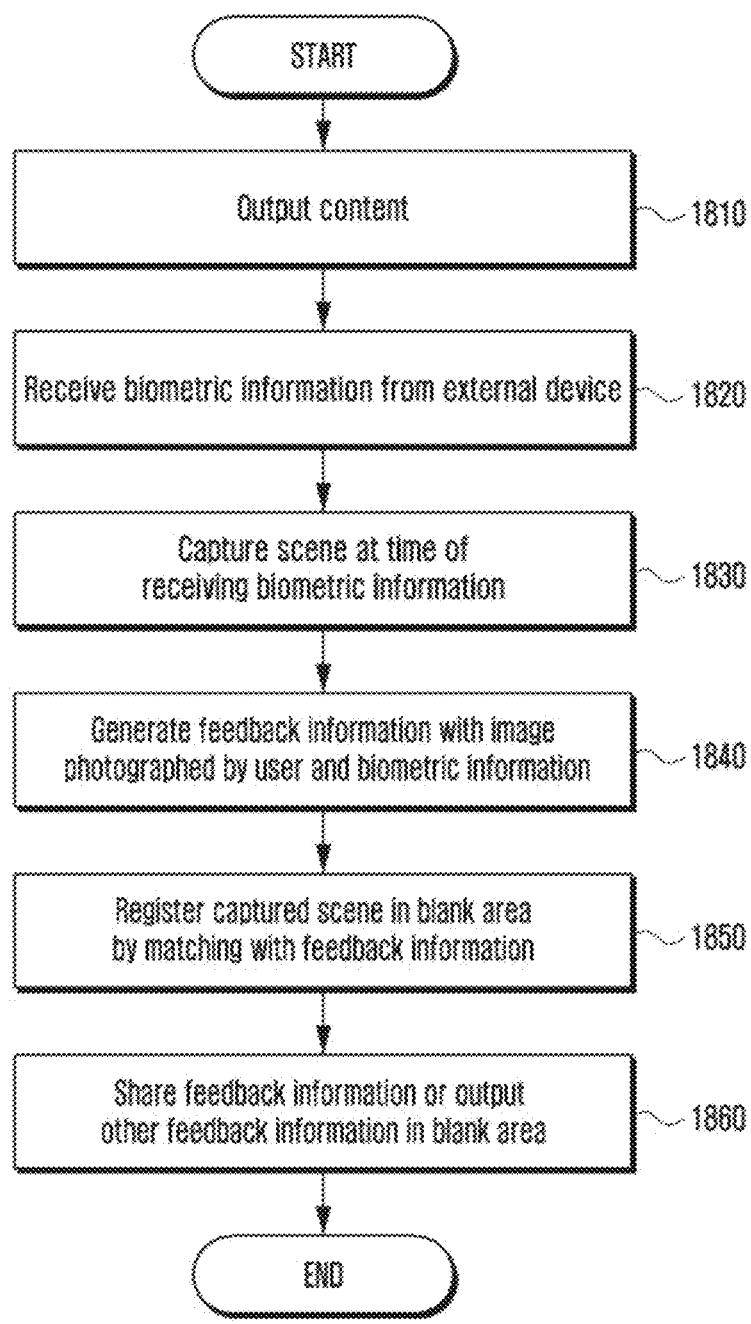
FIG. 18 is a flowchart illustrating a method for outputting content and feedback information by using biometric information according to various embodiments of the present disclosure.

FIG. 18 is a flowchart illustrating a method for outputting content and feedback information by using biometric information according to various embodiments of the present disclosure.

Referring to FIG. 1 and FIG. 18, the processor 120 outputs content at operation 1810. The content may be one of a text, an image, an audio, a video, an icon, and symbol.

The processor 120 receives biometric information from an external device at operation 1820. The external device may be a device paired with the electronic device 101 or a device located a predetermined distance away from the electronic device 101. For example, the external device may be a second wearable device such as a smart watch. The external device can obtain various biometric information using a sensor installed in the device. The external device can transmit the biometric information to the processor 120 through an installed communication unit. For example, the biometric information may include information associated with an electrocardiogram, a pulse, a breath, and a blood flow of a user.

The processor 120 captures a content scene displayed at the time of receiving the biometric information at operation 1830. Further, the processor 120 can generates an image by photographing a user with a camera. The processor 120 can receive a voice (or sound) from a microphone.

The processor 120 generates feedback information with the photographed image of user and biometric information at operation 1840. The feedback information indicates a user's response received while the content scene is being played. The feedback information may include not only the image photographed by a camera but also a voice received from a microphone.

The processor 120 registers the captured scene in the blank area by matching the feedback information at operation 1850. The blank area may exist at both sides of the content or at one side if the content is moved in one direction.

The processor 120 shares the feedback information or outputs other feedback information in the blank area at operation 1860. The sharing of feedback information means transmitting the feedback information to another person or sharing the feedback information with a plurality of persons joined in an identical community by registering the feedback information in the community such as a cafe. The other feedback information may be feedback information received from another person or feedback information downloaded from the community. The output of feedback information may include displaying an image and/or outputting a vibration or sound.

Figure 19B:
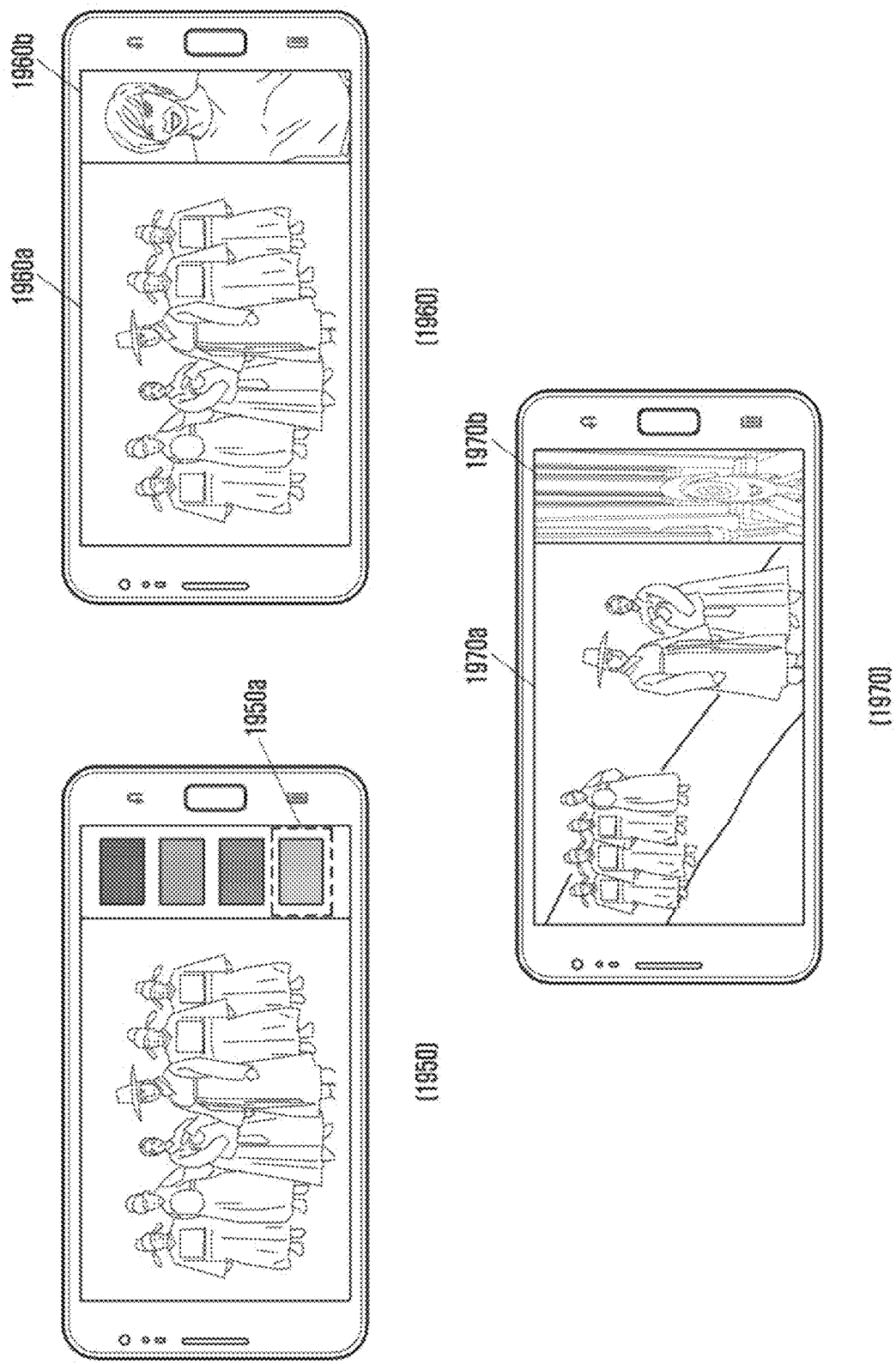

FIGS. 19A and 19B illustrate screen examples of outputting content and feedback information by using biometric information according to various embodiments of the present disclosure.

Referring to FIG. 19A, reference number 1910 illustrates an example of receiving an image from a camera as shown by reference number 1910a or receiving a voice (for example, 'wow', 'what') from a microphone as shown by reference number 1910b when the content (for example, video) is being played. The processor 120 can generate an image associated with a user's joyful face, surprised face, and sad face.

Alternatively, the processor 120 can generate an image based on biometric information received from an external device 1910c. Reference number 1920 illustrates an example of moving the content to the right side as shown by reference number 1920a. According to the movement of content to the right side, the processor 120 can configure a blank area at the left side. Reference number 1920b indicates the configured blank area and an image captured by a camera may be displayed. Alternatively, reference number 1920b may display a bookmark related to the content currently being played, another person's image, my feedback information, or another person's feedback information.

Reference number 1930 illustrates an example of moving the content to the left side as shown by reference number 1930a. By moving the content to the left side, the processor 120 can configure a blank area at the right side of the display 160. Reference number 1930b shows the configured blank area and an image obtained by a camera can be displayed. Alternatively, reference number 1930b can display a bookmark related to the currently playing content, an image of another person, my feedback information, or another person's feedback information.

Reference number 1940 illustrates a graph of feedback information related to a play time after completing the play of content. The processor 120 can provide a graph by storing a photographed image and biometric information related to the play time. The graph may include not only my feedback information but also another person's feedback information and can be illustrated by comparing two kinds of feedback information. The processor 120 can transmit the graph to an external device (for example, wearable device) which transmitted the biometric information. The user can identify his/her own feeling or response at a glance while viewing the video. Further, when the most impressive scene of content is played, various descriptions, assessment of reviewer, response of audience, and photos can be displayed.

Referring to FIG. 19B, reference number 1950 illustrates an example of displaying another person's feedback list while playing content. The user can select feedback information from the feedback list as shown by reference number 1950*a*. Reference number 1960 illustrates an example of displaying the selected feedback information while playing content. Reference number 1960*a* indicates content and reference number 1960*b* shows feedback information in the blank area. Further, the processor 120 may display other information by considering the play time of current content. Reference number 1970 illustrates an example of displaying content and a preview of other content related to the content. Reference number 1970*a* indicates the currently output content, reference number 1970*b* indicates a preview of other content.

As described above, if the content is moved, a wider blank area can be secured because divided blank areas are combined into one. In this case, conveniences can be provided for a user by utilizing the blank area.

Recently, a user's desire to view notifications generated in real time is increasing and the user wants to check a notification while playing a video. Therefore, the smartphone visually transmits the notification to the user by using a popup window indicating a system notification such as a phone call, an alarm, and a recharging notification, a push message or an instant message such as a Google Cloud Message (GCM) Service and SPP using a push server, or a message window in the center of content screen outputting an advertisement.

However, it may be undesirable for a notification to overlap a screen while content is being played, and if a notification UI is not displayed, an important notification may be overlooked. Further, the user may have to frequently touch a notification bar while viewing a video or execute another application in order to identify a notification.

Generally, two types of notification are provided for an electronic device while playing a video. One type is to partially or fully cover a video screen being played by using a notification window covering the whole screen or a popup window covering a part of the screen. The other type is to promptly display and erase a notification when the notification is generated.

Figure 20A:
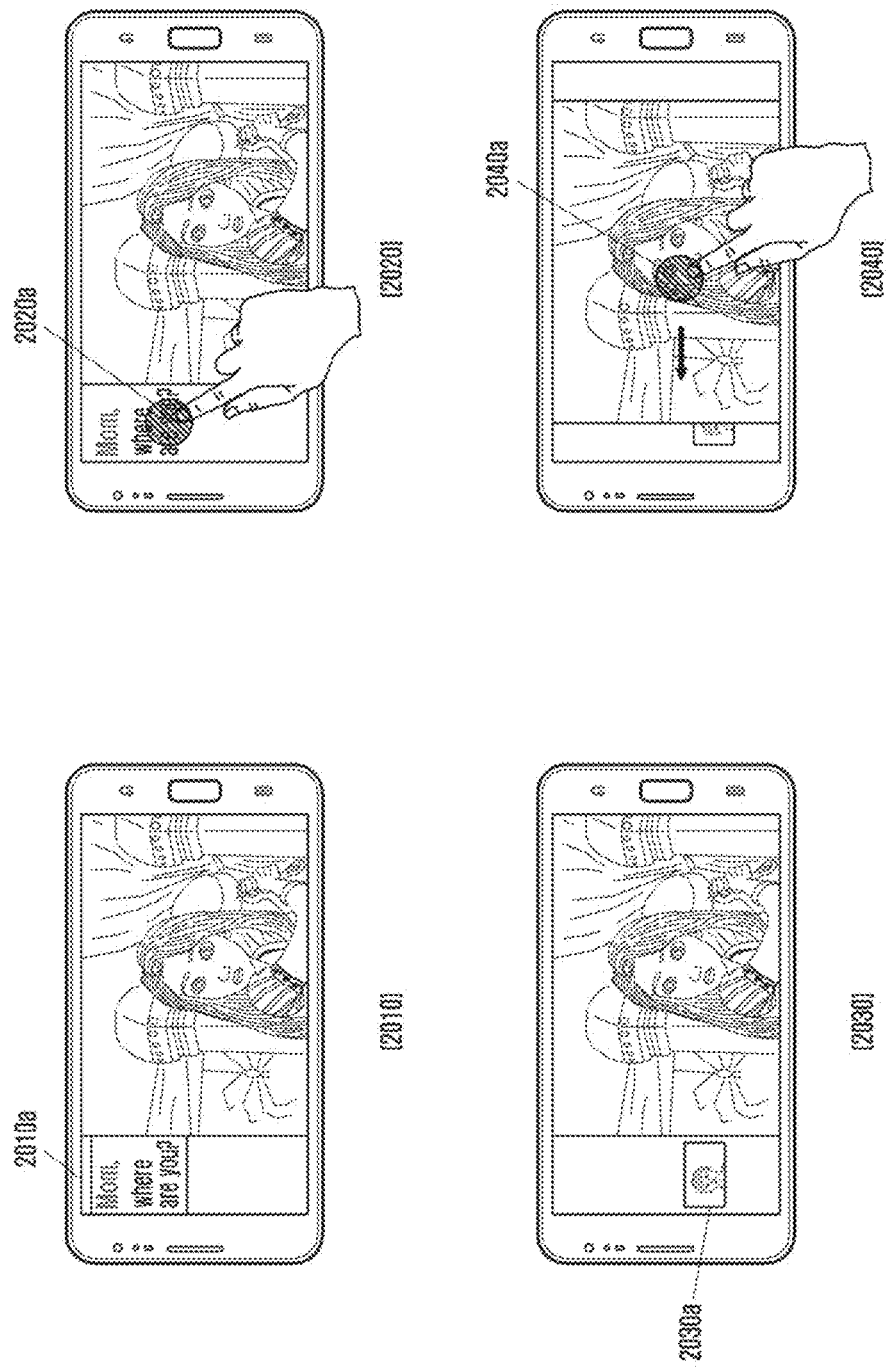
Figure 20B:
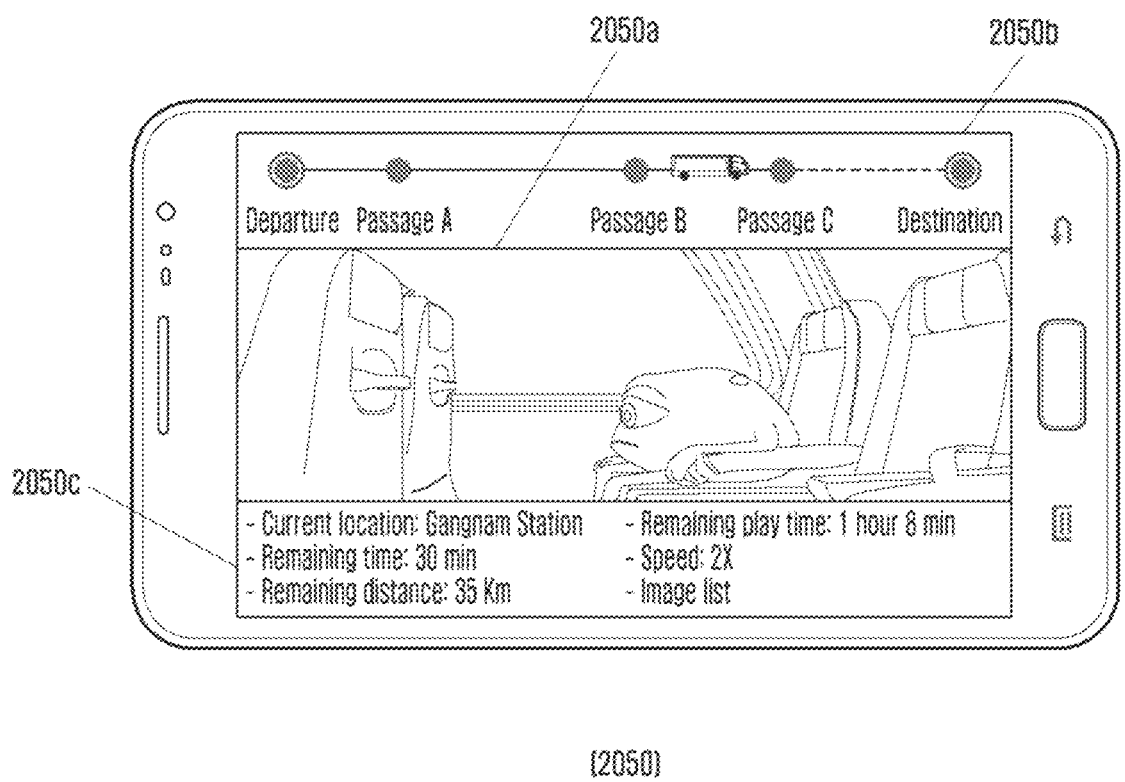

FIGS. 20A to 20C illustrate screen examples of using a blank area in a screen according to various embodiments of the present disclosure.

FIG. 20A illustrates an example of displaying a notification message in a blank area while playing content.

Referring to FIG. 20A, reference number 2010 illustrates an example of displaying a notification in a left blank area 2010*a* and content in the right side. The notification displayed in the blank area 2010*a* may be displayed in the center of screen by resizing from a state displayed in another application or in a form including the simplest description. Further, only the image related to the notification (for example, an icon) may be displayed.

According to various embodiments of the present disclosure, an automatic response function is provided where the automatic response function may be related to the function of displaying an instant message notification in a blank area. If an instant message notification is received from another person while viewing a video, a user may experience an inconvenience of manually executing a second application related to the instant message in a state of temporarily stopping the video in order to promptly response through a keypad.

Therefore, according to various embodiments of the present disclosure, if an instant message is displayed in a blank area where a video is not being played, a function of automatically responding with a simple operation can be provided for a user by touching the message or generating a screen movement event. Reference number 2020 illustrates an example of automatically transmitting a message (for example, "Mom, where are you?") as shown by reference number 2020*a*, if the user touches the instant message. Alternatively, the message (for example, "Mom, where are you?") can be automatically transmitted, if an event is generated to move the content leftward to the blank area where the message (or icon) is displayed.

Reference number 2030 may be displayed in an icon form as shown by reference number 2030*a*, if a predetermined time has elapsed after displaying the notification generated in real time in the blank area. The icon may be a face image of the message transmitter or an application icon. Alternatively, the processor 120 can display an initial blank area by erasing the notification if the predetermined time has elapsed after displaying the notification in the blank area. The processor 120 can provide a UI so that the user's video viewing is not disturbed. Alternatively, if the message notification is not necessary to respond, the message display window automatically disappears after a predetermined time and an icon may be displayed in the blank area. Reference number 2040 illustrates an example of deleting the message notification if an event for moving the content is received in the direction of displayed icon as shown by reference number 2040*a*. According to various embodiments of the present disclosure, a notification can be provided in a simple UI form.

According to various embodiments of the present disclosure, most of users are familiar with playing a video at an electronic device such as a smartphone while using a public transportation means. Information related to a current location can be displayed in a blank area which is generated when content having an image ratio 21:9 is played in a display having a screen ratio 16:9 or content having an image ratio 16:9 is played in a display having a screen ratio 21:9. The user may sometimes want to avoid passing a destination or know the current location while viewing a video.

FIG. 20B illustrating an example of displaying a route, a current location, and related information in a blank area while playing content.

Referring to FIG. 20B, reference number 2050 illustrates an example of displaying a current location in a blank area while playing content. Reference number 2050*a* indicates an area where the content is displayed, reference number 2050*b* indicates a route to a destination, and reference number 2050*c* indicates a distance and the time required between the current location and the destination. According to the present disclosure, additional information such as a current route, a current location, the remaining distance to a destination, the remaining play time, an estimated remaining play time at the destination, and an arrival time may be provided in the blank area. Further, a speed of video play and a list of images available in the route may be displayed in the blank area. The current location can be obtained by a time sharing method through a network, satellite, landmark, and route.

According to various embodiments of the present disclosure, a user can concentrate on the content and experience special effects related to the currently playing content in the blank area. As an example of special effect, concentration into a frame can be enhanced by outputting a color related to the currently playing content in the blank area.

FIG. 20C illustrate an example of applying a special effect to a blank area while playing content.

Referring to FIG. 20C, reference number 2060 illustrates an example of displaying content in the center as shown by reference number 2060a and displaying blank areas 2060b and 2060c in a white color at both sides of the content. If the blank areas are displayed in a black color according to the prior art and the content includes a snow scene, the user may experience a visual difference because the black color contrasting to the color of snow is displayed in the blank area. However, according to the present disclosure, the blank areas are displayed in a white color similar to the color of snow and the user may feel that the blank areas do not exist in the screen and can watch an image without perceiving the distracting contrast of a black blank area. The processor 120 can decide the color of the blank area by analyzing a predetermined area adjacent to both sides of the blank area. For example, the processor 120 may analyze the right and left side area of the blank area as shown by reference number 2060a' and use an average color of the analyzed area or use colors associated with or the same as the color predominantly displayed in the right and left sides of content. Alternatively, a color similar to that of content can be decided and displayed by using another method.

According to various embodiments of the present disclosure, as another example of special effect, an image can be generated by processing a partial or whole frame of content and the generated image can be displayed in the blank area. By this, the unity between the content and the blank area can be improved.

Reference number 2070 illustrates an example of displaying content in the center as shown by reference number 2070a and displaying blurred images in blank areas 2070b and 2070c at both sides of the content. The processor 120 can apply a blurring effect to predetermined areas of content adjacent to the blank areas and display the blurred images respectively in the blank areas. The user cannot identify which one is the blurred image but a visual unity can be obtained because color factors configuring the blurred image is same as those of original image frame.

According to various embodiments of the present disclosure, as another example of special effect, a user can more concentrate in content and feel reality by outputting an image related to the characteristics of playing content in a blank area.

Reference number 2080 illustrates an example of displaying content in the center as shown by reference number 2080a and displaying images related to the content in blank areas 2080b and 2080c at both sides of the content. For example, if the content is a scene displaying a mountain and the sea, an image displaying a mountain and a river can be displayed in the blank area. The processor 120 can display an image of a predetermined area of content adjacent to the blank area in the blank area. Alternatively, if the content includes a raining scene, a dynamic image having a similar tone to that of the raining content scene can be output in the blank area or a dynamic image of rain drops formed on a glass can be displayed. For example, a person viewing the content may be in an actual site or feel an impression of directly viewing the scene though a glass window. If the content includes a snowing scene or a night sky scene, the blank area can be filled by harmonizing with the content and displaying a snowing image or a night sky image including stars.

According to various embodiments of the present disclosure, as further another example of special effect, a function related to a frame of currently playing content can be provided in the blank area.

Figure 21B:
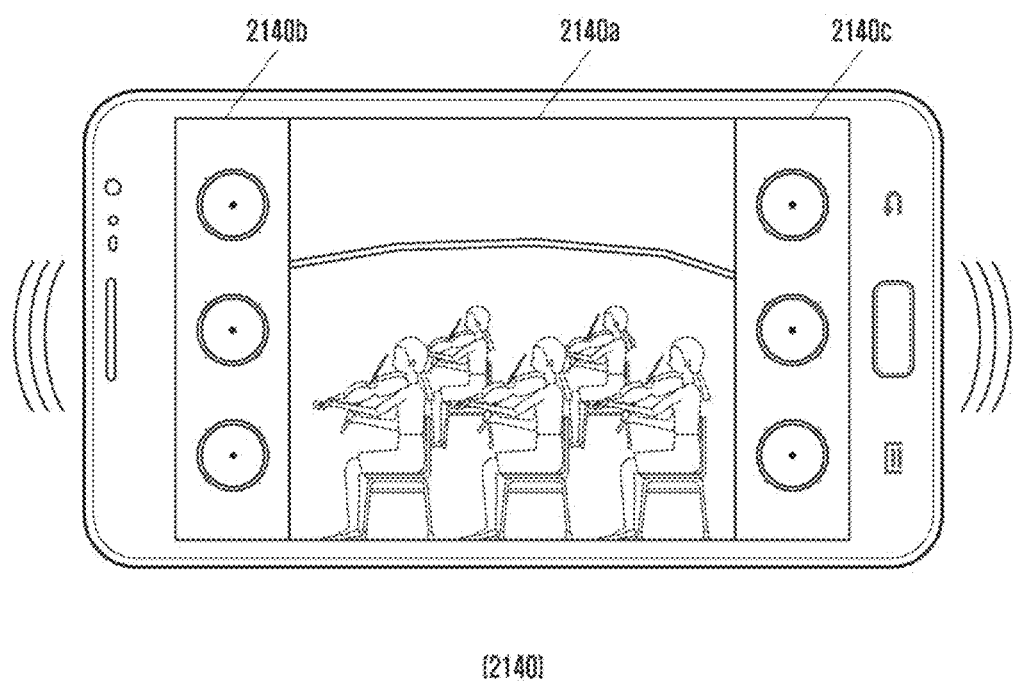

FIGS. 21A to 21C illustrate screen examples of using a blank area in a screen according to various embodiments of the present disclosure.

FIG. 21A illustrates an example of displaying various functions in a blank area while playing content.

Referring to FIG. 21A, reference number 2110 illustrates an example of displaying content related to music in the center as shown by reference number 2110a and displaying an equalizer in the blank area as sown by reference numbers 2110b and 2110c. Accordingly, if the content relates to music, the processor 120 can provide a visual effect and three-dimensional feeling for the music by displaying an equalizer effect in the blank areas 2110b and 2110c. Similarly, if the content includes a car race scene or a car chasing scene, a user can feel more dynamically engaged by displaying an RPM gage in the blank area together with a sound.

Reference number 2120 illustrates an example of displaying sports content in the center of screen as shown by reference number 2120a and displaying an image of the cheering squad related to the content in a blank area as shown by reference numbers 2120b and 2120c. The image of the cheering squad may be stored in the memory 130 of electronic device 101 or a proper image can be downloaded from a network. Alternatively, an image of user's SNS friend or a predetermined user image may be output through the blank area in a fixed form or in real time, or a temporary group of cheering squad can be generated and a cheering scene can be shared with participants.

Reference number 2130 illustrates an example of displaying content as shown by reference number 2130a and a game image in a blank area as shown by reference number 2130b. For example, if a user is not engaged with a playing image or the playing image is not important or necessary, a user may engage with a simple entertainment in the blank area which can be temporarily enjoyed, such as a game of bursting a water balloon or a parody image related to the content being watched.

The processor 120 can provide such special effects by identifying a sound or a color tone of currently playing content in real time or the special effects can be applied by using metadata of the content.

FIG. 21B illustrates an example of displaying a function related to hardware while playing content.

Referring to FIG. 21B, reference number 2140 illustrates an example of displaying content in the center of screen as shown by reference number 2140a and displaying a speaker image in the blank area as shown by reference numbers 2140b and 2410c. The processor 120 can provide a visual and acoustic effect by synchronizing with the hardware of electronic device 101 and outputting a speaker image (for example, a glass & film speaker) in the blank area. If a speaker is visually displayed, harmonization with a screen can be obtained and a user may experience that the music is played through a speaker larger than an actual size.

If a reach sound is generated from the speaker image, a user can experience a more realistic sound as well as the visual effect. Further, because output directions of screen and speaker area are same and locations are close, a problem of covering an output unit of speaker according to a specific location or user's gripping posture can be minimized. In order to generate an actual sound in the right and left or upper and lower blank areas, speakers operating in the corresponding blank area can be installed.

As an example of speaker, a glass speaker can be used. The glass speaker is a speaker which can output a vibration of sound by transmitting a signal to a glass material where a signal generator is installed separately and a glass part generates a sound.

As another example of a speaker, a film speaker can be used.

FIG. 21C illustrates an example of film speaker. The film speaker 2160 is configured with a functional film having a piezoelectric effect for converting a mechanical energy to an electrical energy and an inverse piezoelectric effect for converting an electrical energy to a mechanical energy.

Referring to FIG. 21C, reference number 2150*a* illustrates a piezoelectric effect. The piezoelectric effect is a phenomenon of generating a voltage where an electric signal is generated from an output terminal of piezoelectric device if an external stress or vibration displacement F is applied to the piezoelectric device. Reference numbers 2150*b* and 2150*c* illustrate a principle of inverse piezoelectric effect. The inverse piezoelectric effect refers to a phenomenon of generating a mechanical displacement if a voltage is applied to the piezoelectric device from the outside and is utilized for an actuator or acoustic device. The film speaker 2160 is more flexible and thinner than the glass speaker and thereby more available as an installing location and has an advantage of being easily applied to an unfixed device like a flexible display.

According to various embodiments of the present disclosure, various functions can be provided in a blank area of screen without having to reduce the size or ratio of initial output content.

According to various embodiments of the present disclosure, various functions can be provided in a blank area of screen by adjusting the size or ratio of initial output content.

According to various embodiments of the present disclosure, blank areas scattered in a screen can be combined into a new blank area by moving output content to the top, bottom, right, or left side.

According to various embodiments of the present disclosure, at least one function can be executed in a newly combined blank area without covering output content.

According to various embodiments of the present disclosure, a function and mode provided in a blank area can be automatically changed according to a user's emotion and situation detected by various sensors.

According to various embodiments of the present disclosure, not only the function related to outputting of content but also an independently executable application can be displayed in a blank area and a notification window such as a popup message and a toast message can be adjusted to fit into the size of the blank area.

According to various embodiments of the present disclosure, a user interface can be provided so that various functions displayed in a blank area are conveniently performed and various touch event can be utilized.

According to various embodiments of the present disclosure, user conveniences can be improved because various functions are provided without disturbing a view of output content.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
a touchscreen;
a memory configured to store a plurality of instructions; and
a processor operatively connected to the touchscreen and the memory,
wherein the plurality of instructions includes one or more instructions for:
based on a selection of a video content, displaying within a window the selected video content spanning across the window from a left side of the window to a right side of the window and between a first blank area above the video content in the window and a second blank area below the video content in the window, and
based on a touch input on the video content being displayed and a drag in an upward direction, moving the video content being displayed upward in the window and displaying items related to the video content beneath the video content being displayed,
wherein the items related to the video content comprise a map displaying a related area and a related image.

2. The electronic device of claim 1,
wherein the first blank area spans across the window from a left side of the window to a right side of the window between an upper side of the window and an upper side of the video content being displayed, and
wherein the second blank area spans across the window from a left side of the window to a right side of the window between a lower side of the video content being displayed and a lower side of the window.

3. The electronic device of claim 1, wherein, prior to the touch input on the video content being displayed, the first blank area and the second blank area are displayed as a black color.

4. The electronic device of claim 1, wherein, prior to the touch input on the video content being displayed, the first blank area and the second blank area are the same size.

5. The electronic device of claim 1, wherein the plurality of instructions further includes one or more instructions for:
prior to the touch input on the video content being displayed, playing the video content.

6. The electronic device of claim 5, wherein the plurality of instructions further includes one or more instructions for:
prior to the touch input on the video content being displayed, while the video content is being played, receiving a pause command via a displayed pause indicator.

7. The electronic device of claim 5, wherein the plurality of instructions further includes one or more instructions for:
after the touch input on the video content being displayed, continuing to play the video content.

8. The electronic device of claim 7, wherein the plurality of instructions further includes one or more instructions for:
after the drag in an upward direction, continuing to play the video content.

9. The electronic device of claim 8, wherein the plurality of instructions further includes one or more instructions for:
after the movement of the video content being displayed upward in the window, while the video content continues to be played, receiving a pause command via a displayed pause indicator.

10. The electronic device of claim 1, wherein the plurality of instructions further includes one or more instructions for:
after the movement of the video content being displayed upward in the window and based on another touch input on the video content being displayed and drag in a downward direction, moving the video content being displayed downward in the window and discontinuing the display of the items related to the video content beneath the video content being displayed.

11. The electronic device of claim 1, wherein the plurality of instructions further includes one or more instructions for:
based on the movement of the video content being displayed upward in the window, adjusting a ratio of the video content being displayed.

12. A method by an electronic device, the method comprising:
based on a selection of a video content, displaying within a window the selected video content spanning across the window from a left side of the window to a right side of the window and between a first blank area above the video content in the window and a second blank area below the video content in the window; and
based on a touch input on the video content being displayed and a drag in an upward direction, moving the video content being displayed upward in the window and displaying items related to the video content beneath the video content being displayed,
wherein the items related to the video content comprise a map displaying a related area and a related image.

13. The method of claim 12,
wherein the first blank area spans across the window from a left side of the window to a right side of the window between an upper side of the window and an upper side of the video content being displayed, and
wherein the second blank area spans across the window from a left side of the window to a right side of the window between a lower side of the video content being displayed and a lower side of the window.

14. The method of claim 12, wherein, prior to the touch input on the video content being displayed, the first blank area and the second blank area are displayed as a black color.

15. The method of claim 12, wherein, prior to the touch input on the video content being displayed, the first blank area and the second blank area are the same size.

16. The method of claim 12, wherein, prior to the touch input on the video content being displayed, the first blank area and the second blank area are the same size.

17. The method of claim 16, further comprising:
prior to the touch input on the video content being displayed, while the video content is being played, receiving a pause command via a displayed pause indicator.

18. The method of claim 16, further comprising:
after the touch input on the video content being displayed, continuing to play the video content.

19. The method of claim 18, further comprising:
after the drag in an upward direction, continuing to play the video content.

20. The method of claim 19, further comprising:
after the movement of the video content being displayed upward in the window, while the video content continues to be played, receiving a pause command via a displayed pause indicator.

21. The method of claim 12, further comprising:
after the movement of the video content being displayed upward in the window and based on another touch input on the video content being displayed and drag in a downward direction, moving the video content being displayed downward in the window and discontinuing the display of the items related to the video content beneath the video content being displayed.

22. The method of claim 12, further comprising:
based on the movement of the video content being displayed upward in the window, adjusting a ratio of the video content being displayed.

23. A non-transitory computer-readable medium comprising instructions, which when executed by a processor of an electronic device, causes the processor to control the operations of:
based on a selection of a video content, displaying within a window the selected video content spanning across the window from a left side of the window to a right side of the window and between a first blank area above the video content in the window and a second blank area below the video content in the window; and
based on a touch input on the video content being displayed and a drag in an upward direction, moving the video content being displayed upward in the window and displaying items related to the video content beneath the video content being displayed,
wherein the items related to the video content comprise a map displaying a related area and a related image.

* * * * *